Nov. 28, 1961  O. K. KELLEY  3,010,342
CROSS DRIVE FOR HEAVY VEHICLES
Original Filed July 21, 1947  10 Sheets-Sheet 2

Inventor
Oliver K. Kelley
Willits, Helmig & Boullio
Attorneys

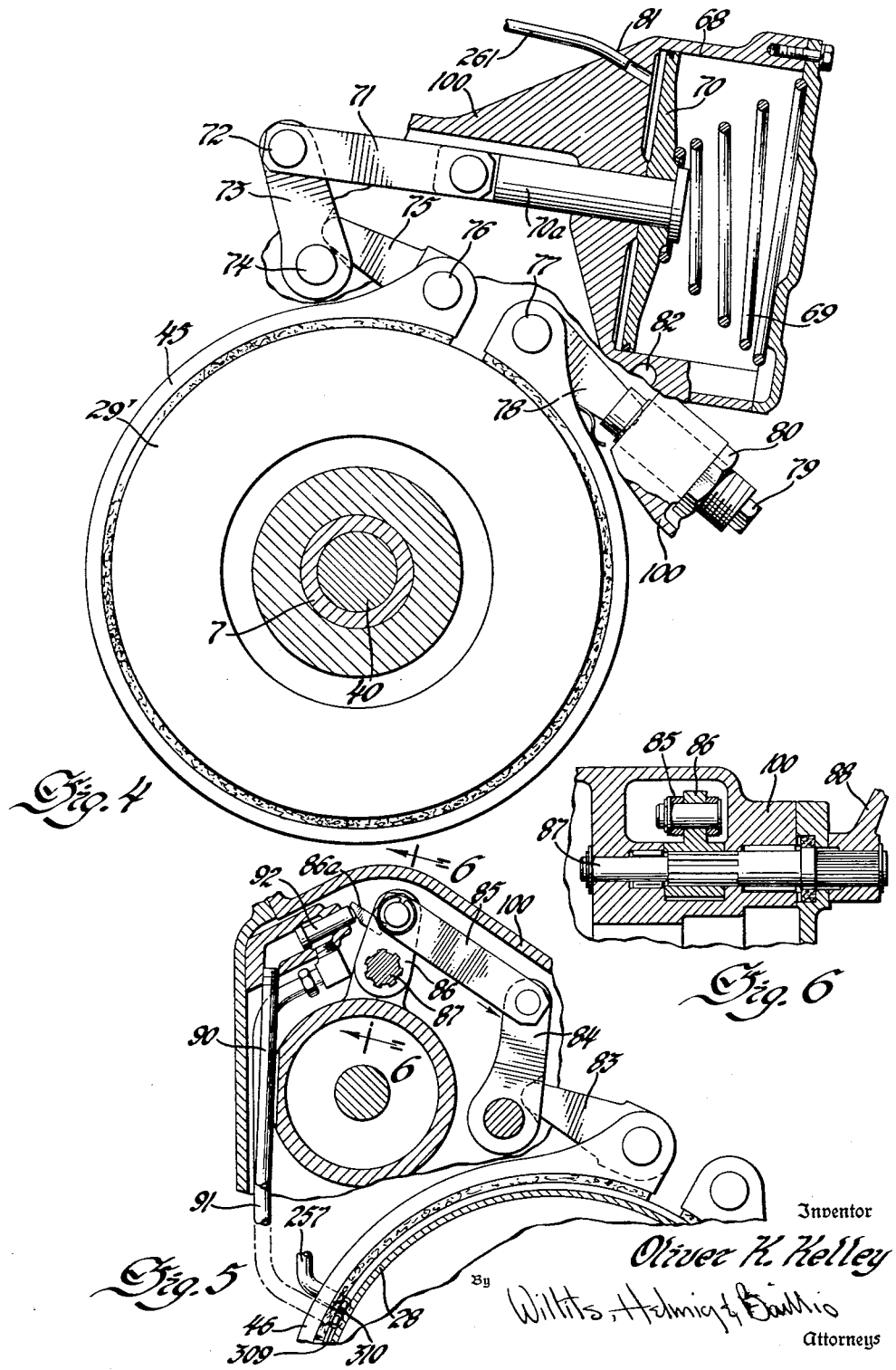

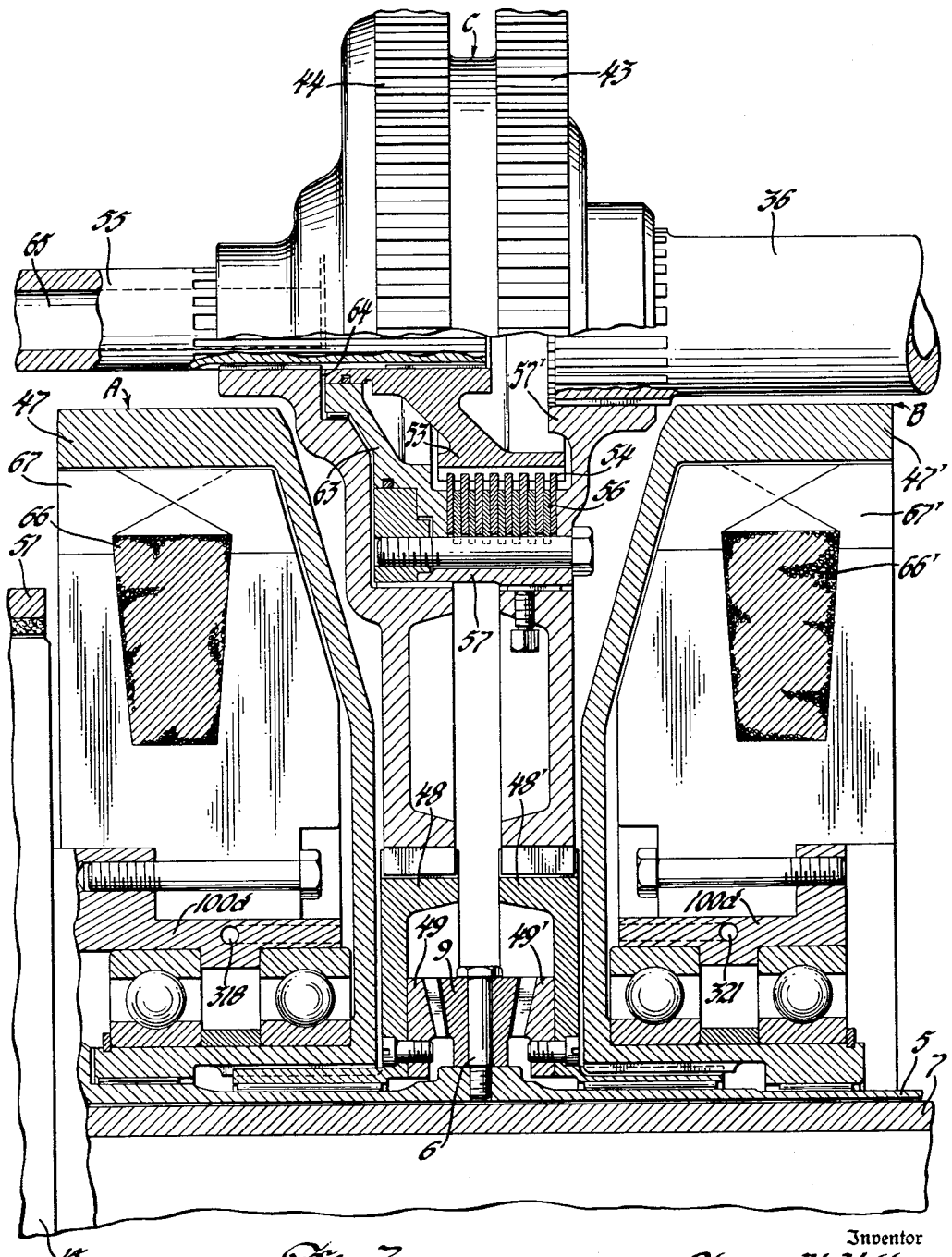

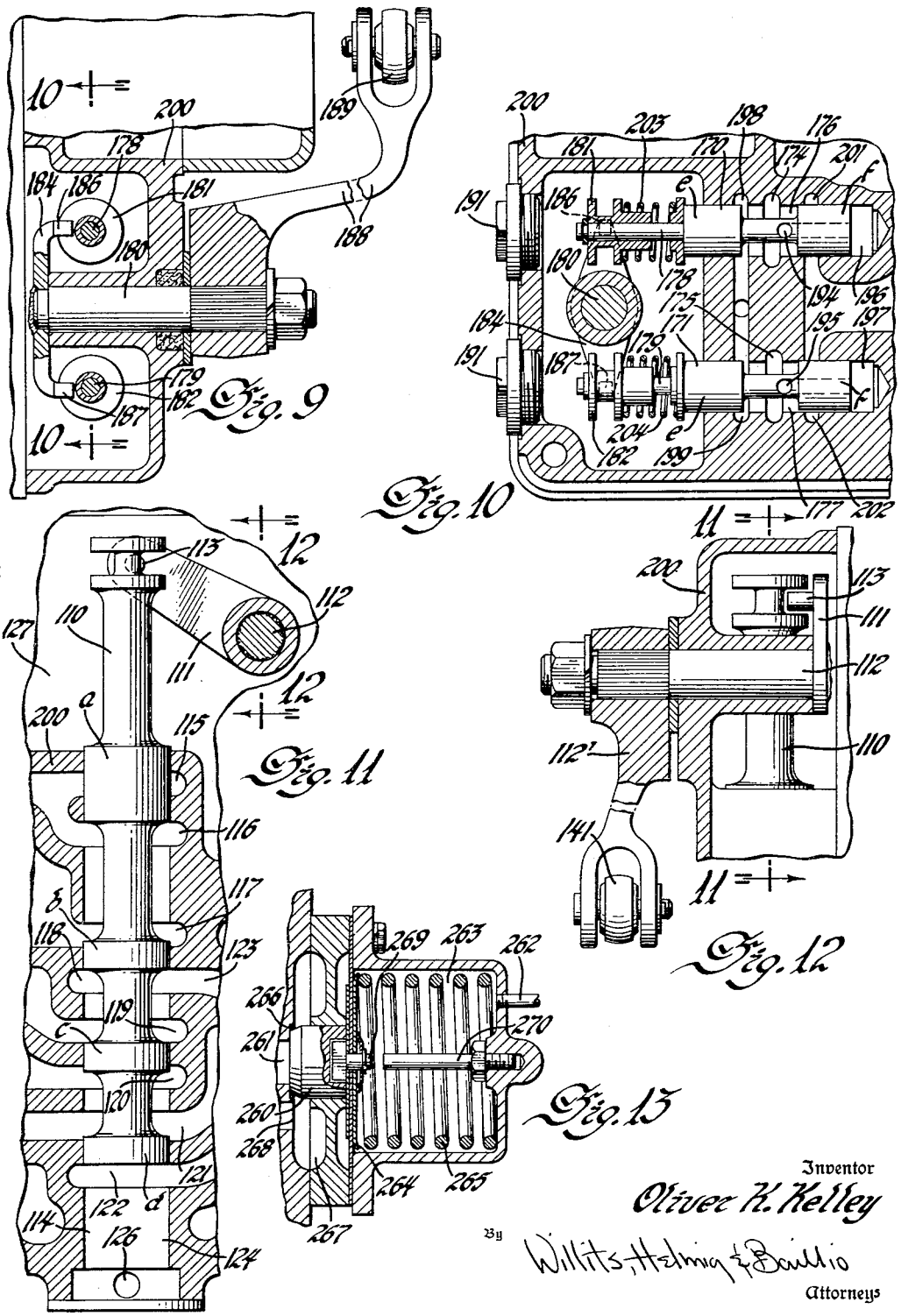

Nov. 28, 1961  O. K. KELLEY  3,010,342
CROSS DRIVE FOR HEAVY VEHICLES
Original Filed July 21, 1947  10 Sheets-Sheet 8
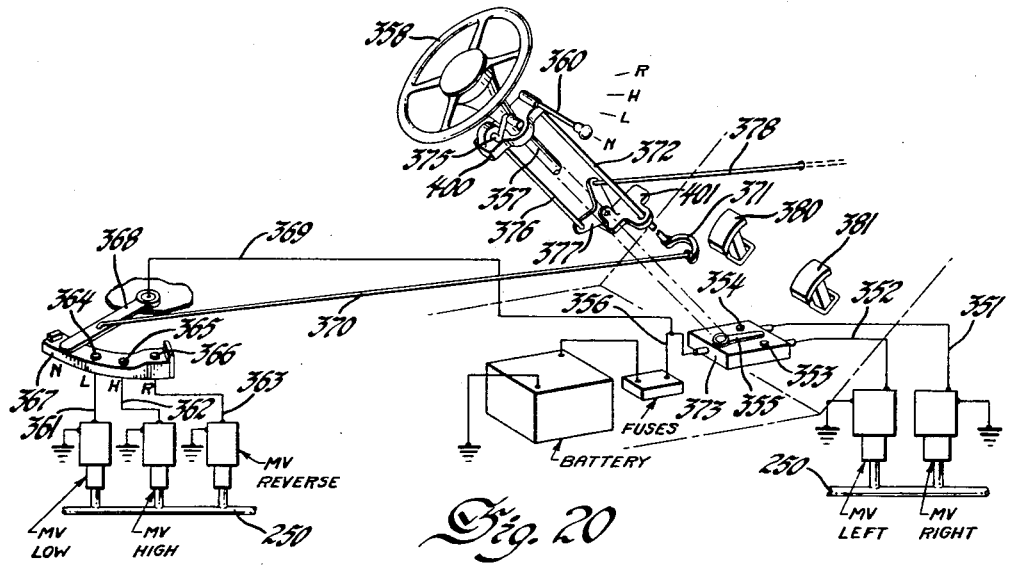
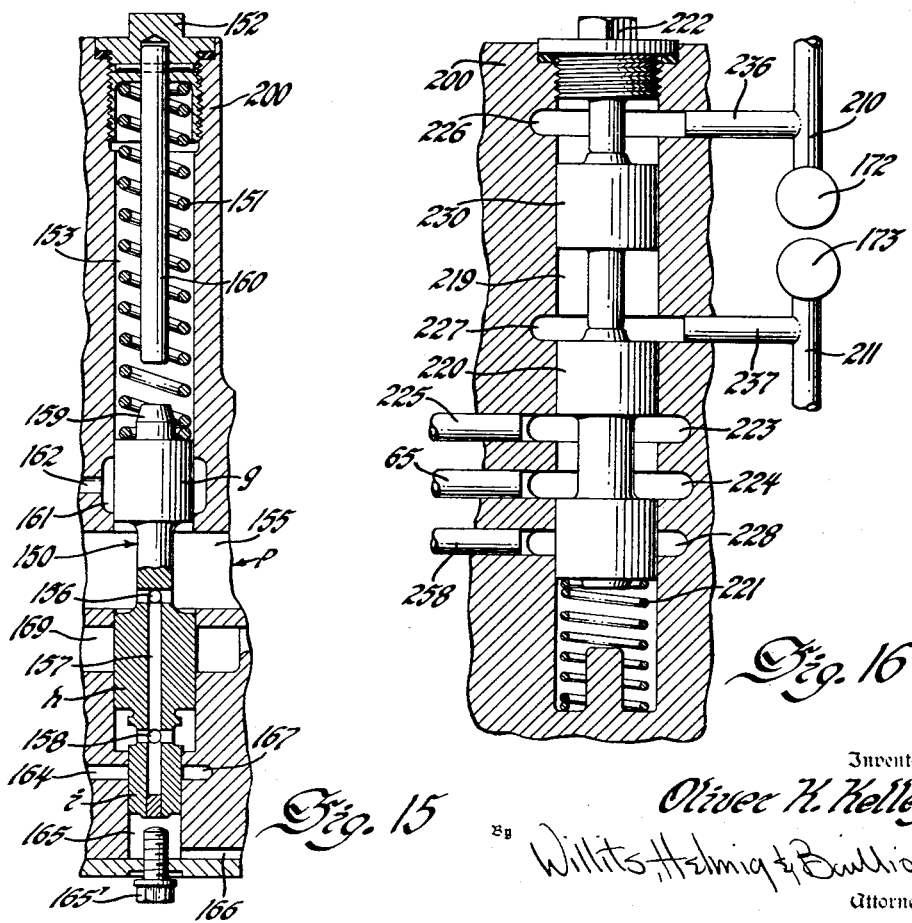
Inventor
Oliver K. Kelley
By Willits, Helmig & Bullio
Attorneys

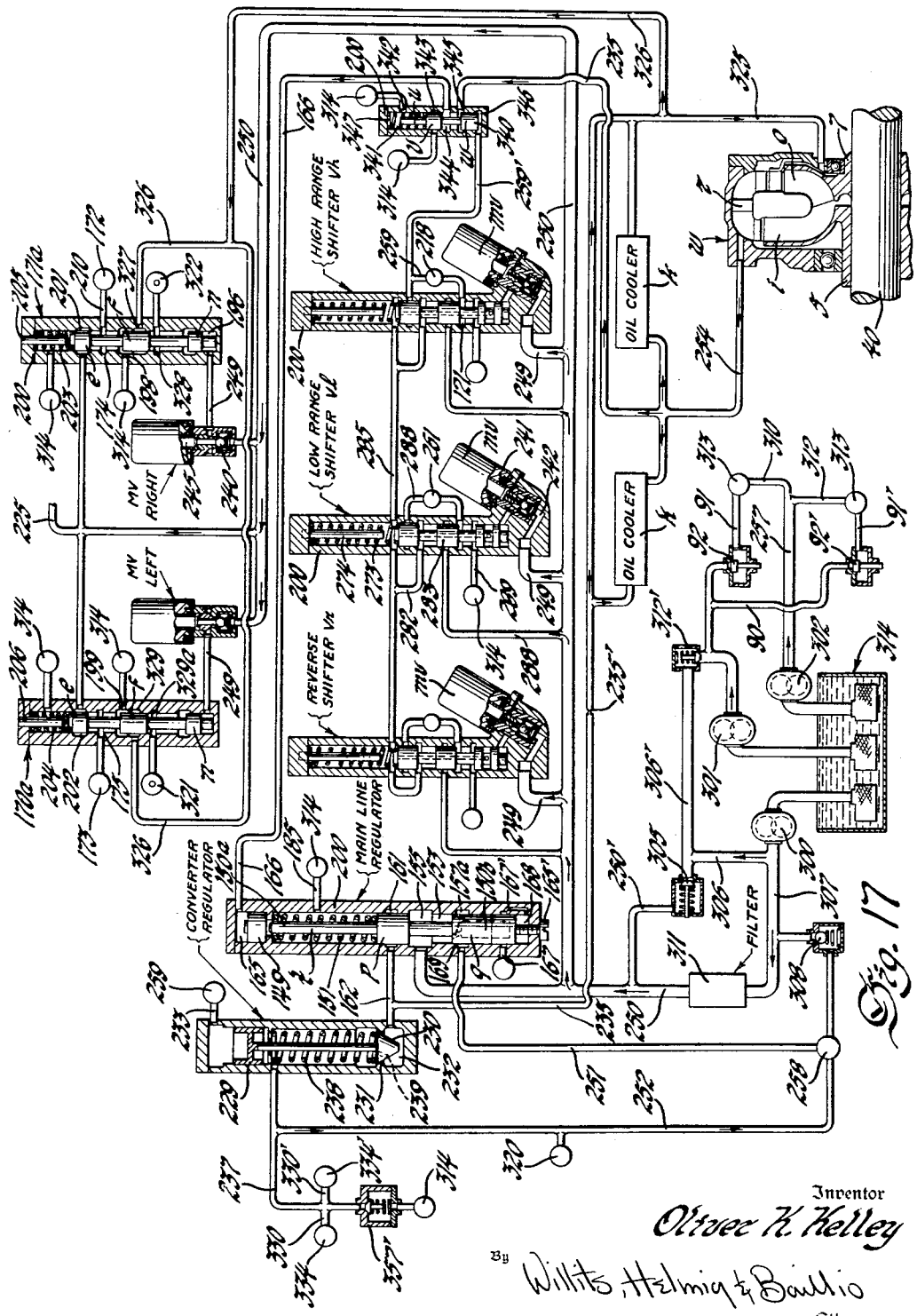

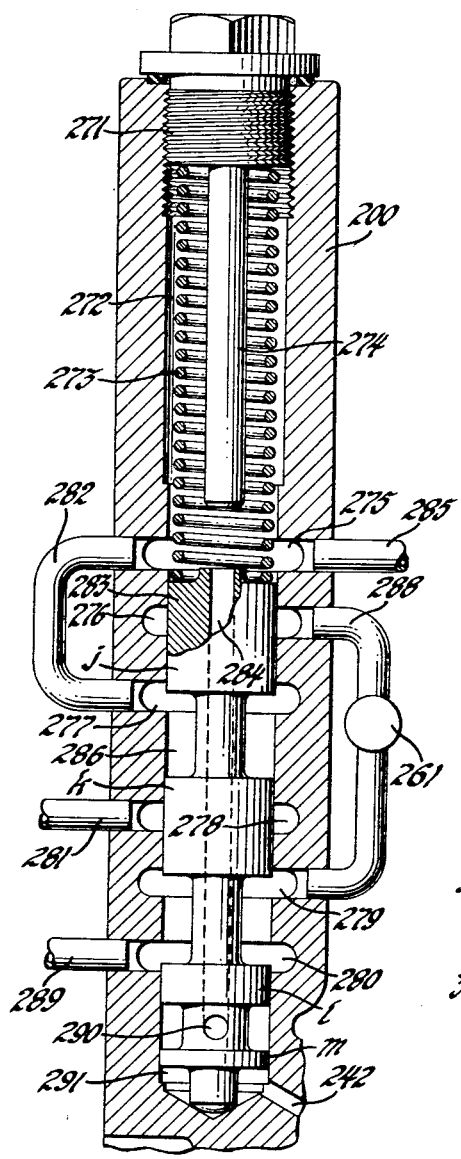
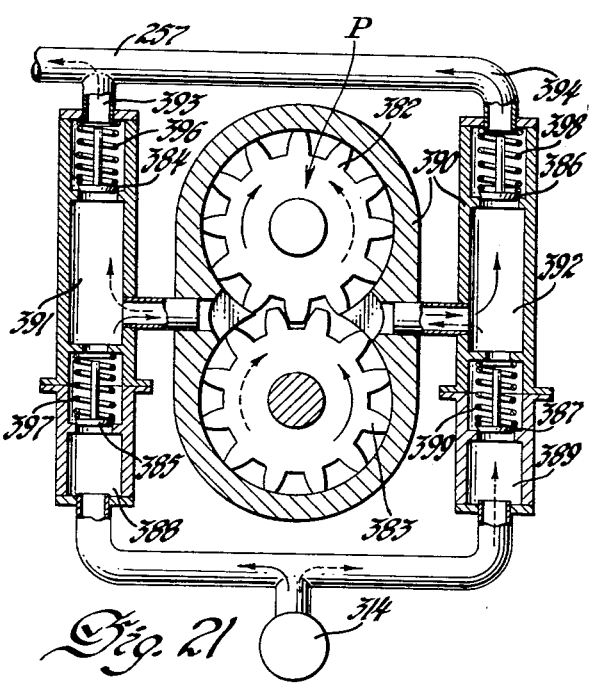

United States Patent Office 3,010,342
Patented Nov. 28, 1961

3,010,342
CROSS DRIVE FOR HEAVY VEHICLES
Oliver K. Kelley, Birmingham, Mich., assignor to General Motors Corporation, Detroit, Mich., a corporation of Delaware
Division of application Ser. No. 762,414, July 21, 1947, now Patent No. 2,596,931, dated May 13, 1952. Continuation of abandoned application Ser. No. 58,196, Nov. 4, 1948. This application Jan. 9, 1952, Ser. No. 265,608
24 Claims. (Cl. 74—710.5)

This is a division of my Patent 2,596,931, filed July 21, 1947, and issued May 13, 1952, and a continuation of abandoned divisional application S.N. 58,196.

The present invention relates to drive mechanism for large heavy vehicles such as military tanks, tractors and the like, having track laying mechanism steered by variable speed ratio differential means.

It relates more particularly to such mechanisms in which quick steering and reversing of direction of travel is required, and for which the drive mechanism embodies an arrangement of units producing plural and continuously variable torque components combined advantageously for the stated purposes.

A primary object is to provide a common drive to right and left hand truck drivers which includes final drive output gear units commonly driven thru divided torque paths, one of which is supplied by coupled differential gearing driven from a prime mover and the other of which is driven by combined selective change speed gearing and fluid torque converter mechanism, for the purpose of obtaining maximum smoothness of torque during speed ratio transition periods and for obtaining similar smoothness in steering effect created by establishing of a variable range of selected reaction torques in said differential gearing.

The present invention representing improvements over the invention described in my Patent No. 2,585,790, filed April 16, 1945 and issued Feb. 12, 1952, in certain important particulars, it is obvious that the general objects stated in that application are likewise sought herewith insofar as the subject matter of both applications would permit.

A further object is to provide a power transmission system for track laying vehicles having concentric primary and final drive mechanisms with parallel shaft differential mechanism coupling to the said final drive mechanisms so as to provide divided and recombined torque for the purposes above stated, of the same hand of rotation of said mechanisms, for forward drive, the advantages including improved power output with less wear due to lower friction losses.

An important object is the provision of a high degree of compactness of the driving and steering assembly obtained by nesting of the variable speed drive, the differential unit, and the output unit parts, resulting in extremely low torsional couples in the supporting structures with balancing out of the reaction couples ordinarily experienced in devices of this character.

In the disclosure herewith another important object is achieved, that of providing exceptionally useful efficiency in the variation of the split-torque ratio favoring the transfer of torque to the fluid torque converter portion of the drive with increased converter efficiency, resulting in an extension of useful torque converter speed range having as a further resultant a rising engine speed characteristic in this process.

An additional object is to provide a dynamic steering-driving assembly having continuously variable speed ratio drive compounded from divided torque paths one of which includes a fluid torque converter adapted to deliver a variable torque component to each of the vehicle tread-driving, final drive output gear units, and the other of which includes a differential steering gear train mechanically connected and adapted to deliver additive components of torque to said output gear units, a supplementary object being to provide in this assembly the desirable characteristics that the division of torque between the paths varies to favor the assumption of a higher torque with increase of efficiency of the fluid torque converter.

A further object is the provision, in such an assembly as stated above, of means for varying the vehicle steering radius to increase and decrease with vehicle speed for sharp steering at low speed and stabilized steering at high speed, and of means for pivoting the vehicle at standstill by the same means utilized for said variable radius steering.

It is an important object herein to provide a driving and steering assembly which shall utilize the power dividing and recombining feature outlined above and which shall apply the variable steering torque component delivered to the final drive output units thru a mechanical gear train or trains while applying the continuously variable torque converter and connecting reduction gear trains, the ratios of which are selective for plural forward, and reverse drives.

It is an added object to provide herein a dynamic power steered and driven assembly for vehicles in which under given selected drive conditions, may embody means for reapplying a torque from the output to the input side of a unit of the variable speed drive train, for obtaining a higher net torque at a reduction speed ratio than the said train would normally deliver.

Further and additional objects will appear in the discussion of the following specification.

Figure 1:
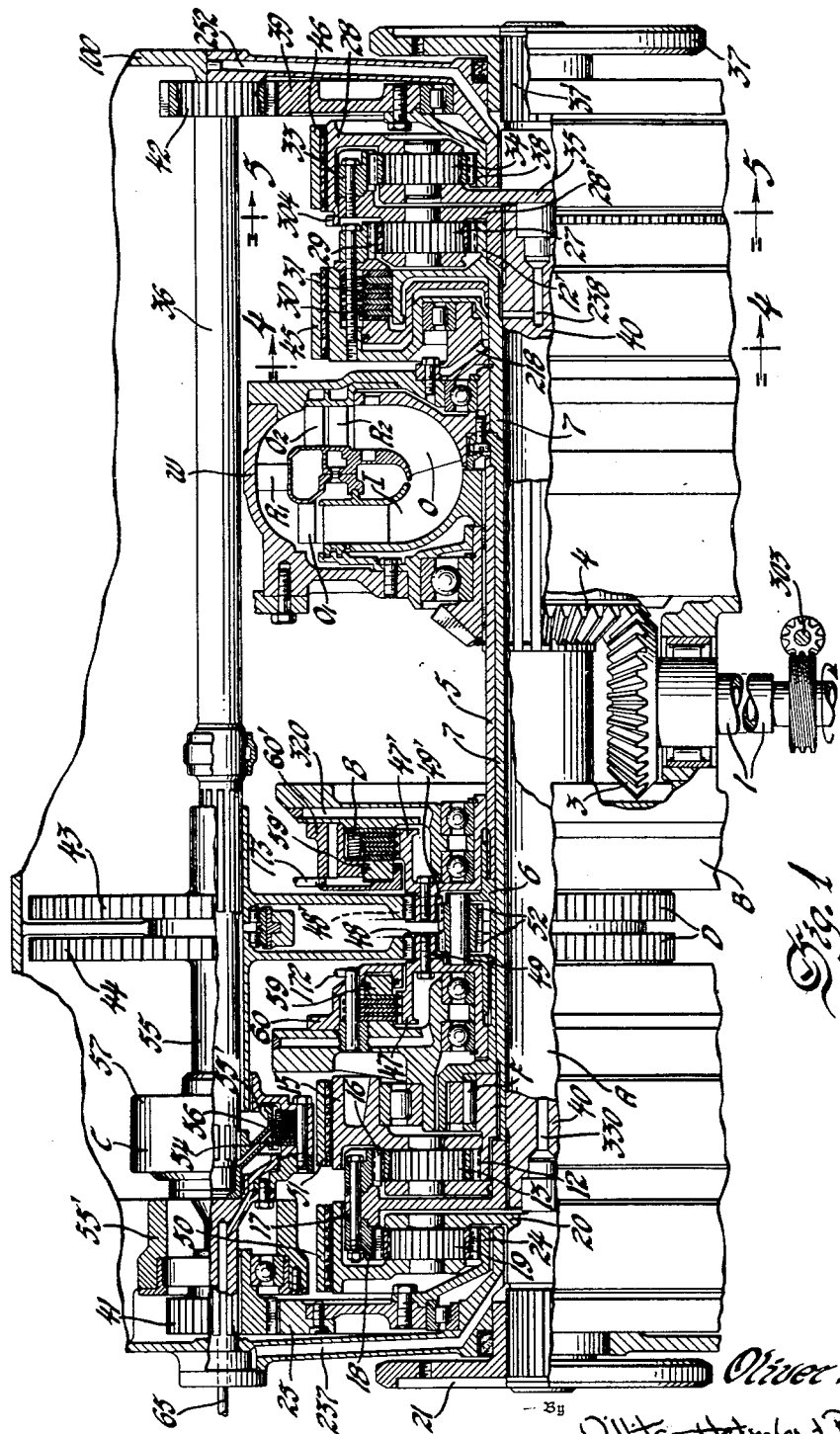
FIG. 1 is a transverse sectional view of the driving assembly, showing the input shaft from the engine geared to the primary power drive, and the output sprocket drivers at the right and left.

FIG. 4 is a section taken at 4—4 of FIG. 1 to show the operating mechanism for the reaction brake 45 for low gear drive. FIG. 5 is a similar part section taken at 5—5 of FIG. 1 to show the somewhat different arrangement for the actuation of brake 46 which controls the speed of the output shaft on the right of the assembly of FIG. 1. It should be noted that brake 51 is controlled in accordance with FIG. 4, and brake 50 in the manner of FIG. 5. FIG. 6 is a sectional detail of the external mechanism connected to the construction of FIG. 5.

Figure 2:
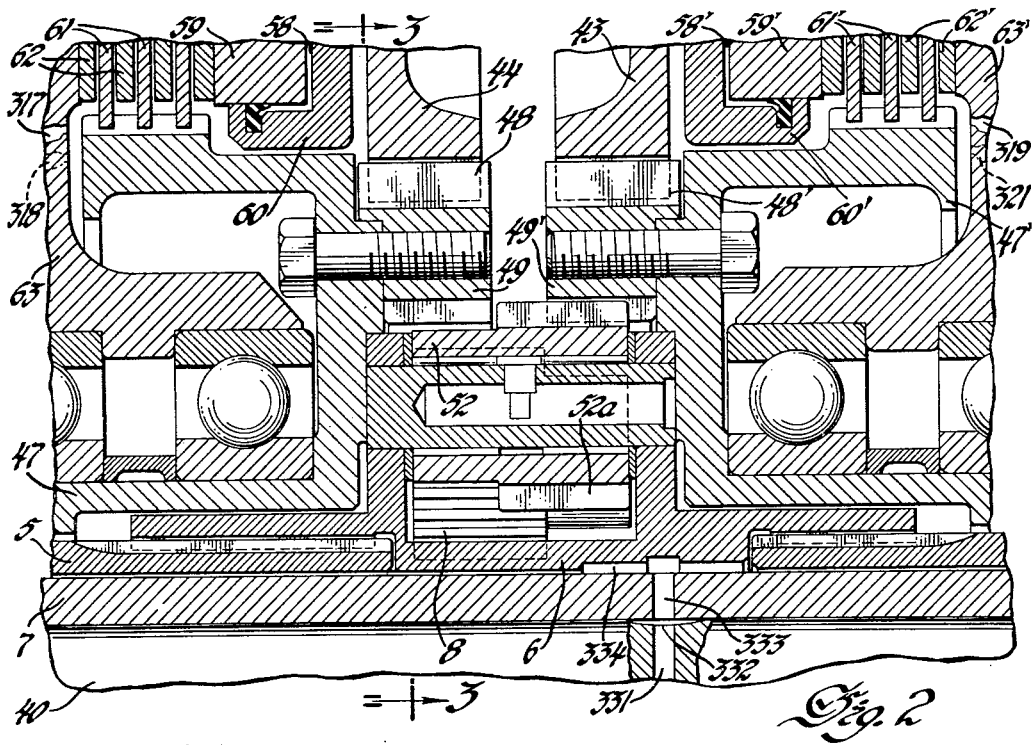
FIG. 2 is a detailed section view of the differential coupling arrangement of FIG. 1 for the powered steering effect derived thru the compensator group at the top of FIG. 1.

FIG. 7 shows an alternative construction to that of FIG. 2 being a sectional view of a bevel-gear differential as distinct from the spur-gear differential of FIG. 2. FIG. 7 also shows a compensator group clutch arrangement alternative to that shown in FIGS. 1 and 2, and shows electrical steering brake means in place of the fluid pressure system shown in FIG. 1.

Figure 8:
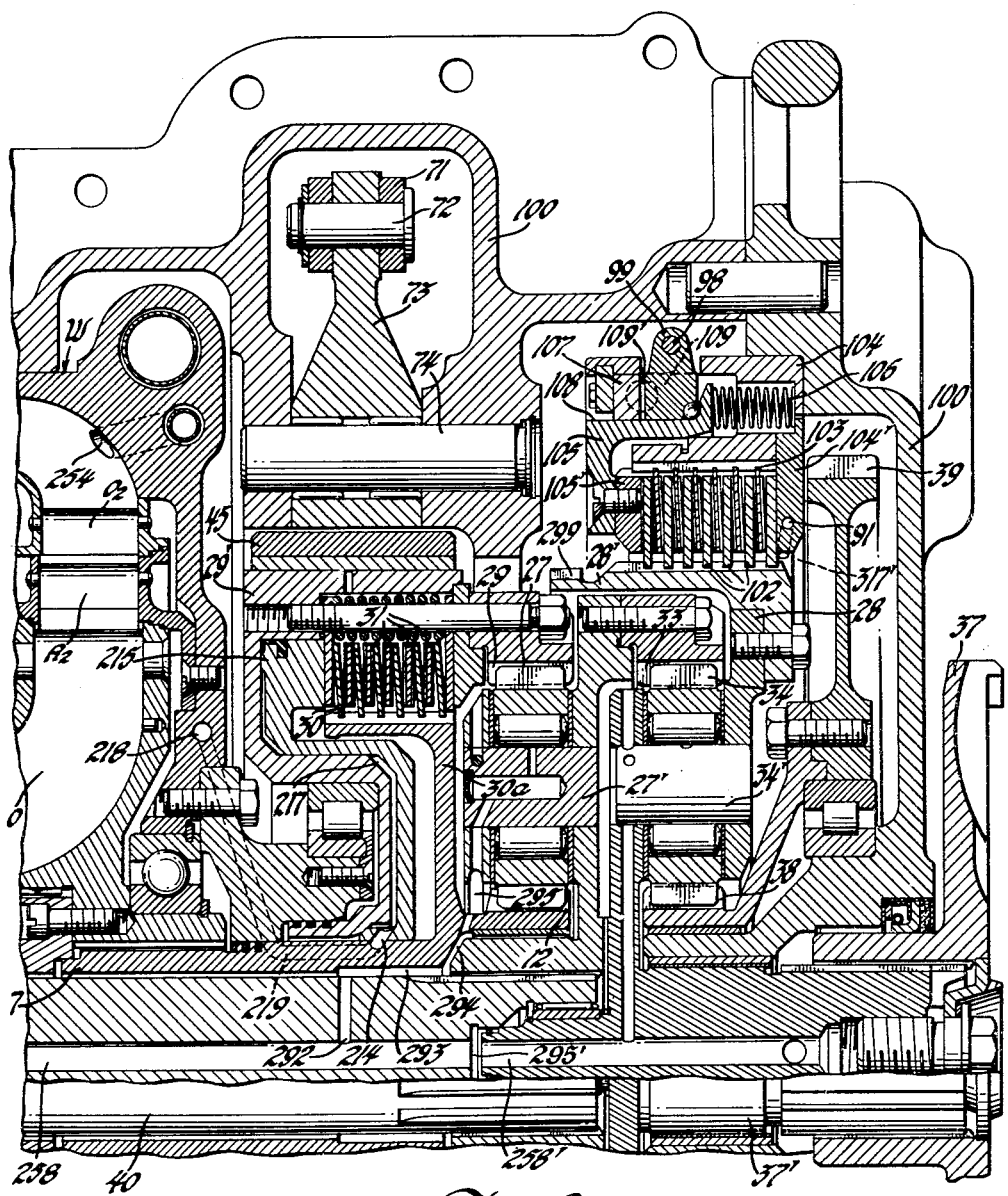

FIG. 8 is an enlarged view of the sectional structure at the right of FIG. 1, modified by the substitution of a disc brake for the output sprocket shafts of FIG. 1.

FIGS. 9 and 10 show elevation sections in right angle planes respectively for the mechanical connections to the control valves for the steering action applied by fluid pressure to the differential steering clutches of FIG. 1.

Figure 14:
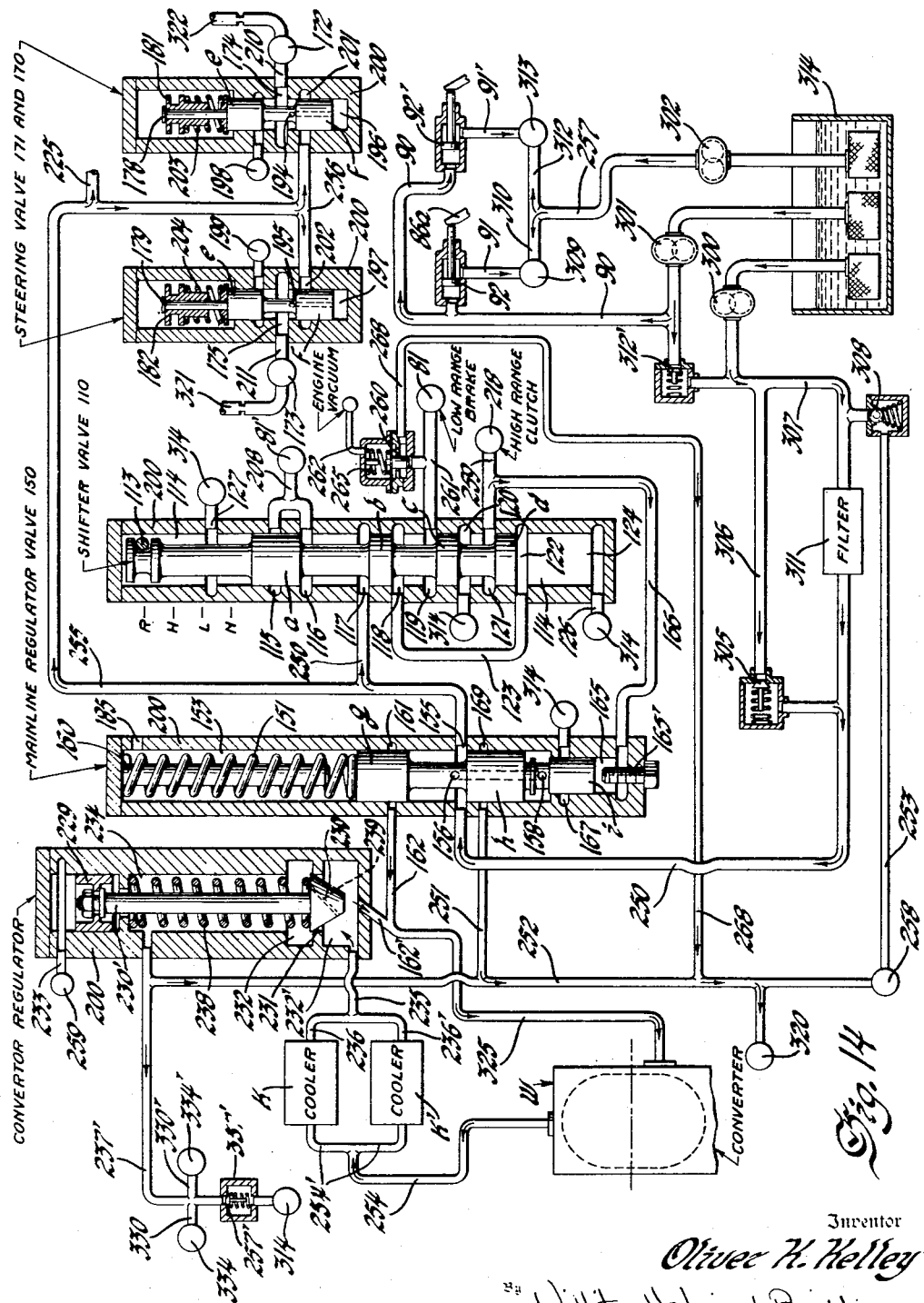

FIGS. 11 and 12 represent the drive-selection valve and its external control, respectively for the modification system shown in FIG. 14 in diagrammatic form. The two steering valves of FIGS. 9 and 10 are shown in the upper right corner of FIG. 14 and the ratio selection valve of FIG. 11 is shown adjacent to them toward the center of the diagram. FIG. 13 is a sectional detail of a vacuum-responsive valve adapted to cushion the ratio down-shift effect by controlling the application of line pressure admitted to the transmission drive system by the shifter valve of FIG. 11. The diagram of FIG. 14 shows the valve of FIG. 13 at the right of the shifter valve.

FIG. 14 is a schematic diagram of a fluid pressure system for control and operation of the drive structures of FIG. 1. FIG. 15 is a detailed sectional view of the pressure regulator valve of FIG. 14. FIG. 16 is a sectional detailed view of auxiliary valving energized during the power steering interval as controlled by the FIG. 14 arrangement.

FIG. 17 is a schematic diagram of a combined fluid pressure and electrical control system, as a modification of the FIG. 14 system, wherein the ratio-controlling valving is by individual valves, electrically operated, and other differentiations are provided, as explained further in detail. FIG. 18 is a view, similar to that of FIG. 15, of the pressure regulator valve of FIG. 17. FIG. 19 is a detailed sectional view of one of the solenoid-actuated control valves shown in FIG. 17, wherein the control impulses such as supplied from an operator's control system, as shown in FIG. 20 diagrammatically, are converted to fluid pressure flow response.

FIG. 21 is a diagrammatic view of a form of pump which may be used to replace certain of the pumps of FIGURES 14 or 17, as required.

In my above mentioned Patent 2,585,790 the output units consisted of variable speed input sun gears and output shaft connected carriers having power steering drive applied to annulus gears.

The present application has output units operating in the same general manner except that the variable speed ratio input is applied to the annulus gears and the power steering differential drive to the sun gears.

In both, the split torque principle is used, of dividing the input torque thru two trains, variable speed drive and power steering, and combining the torques in the output gear units.

This dividing and combining principle is shown in a somewhat different form in my Letters Patent U.S. 2,176,138 issued October 17, 1939, in the drive for the so-called Hydromatic transmission, and in my Letters Patent U.S. 2,211,233 issued August 13, 1940.

In the present arrangement, the differential power train consists of shafts 36 and 55 geared at 41, 25 and 42, 39 to output sun gears 24 and 38, the shafts being normally coupled by clutch C for unitary rotation in the same hand of rotation, this feature being different from the arrangement in Serial No. 588,475, where the secondary power group has two shafts geared for opposite rotation.

For economy of space and for resolution of drag couples to one concentric alignment, the power steering differential centerline is herein concentric with the output unit centerline.

It has been found that the introduction of the split-torque principle into the compound fluid turbine and gear drive assemblies embodying dynamic-steering provides a high attainable efficiency over comparative series unit drive assemblies without impairing the desirable drive characteristics of the fluid units.

In the present invention the power is delivered thru a mechanical path and a hydraulic and mechanical path, the first including a planetary gear train having planet gear carrier rotating fixedly with the output shaft, and having a sun gear and ring gear one of which couples to the output of the fluid torque converter unit W, the other to the input side of the fluid unit.

In the drive pattern of FIG. 1 the planet carriers 20 and 35 are fixed to or integral with the output sprocket drive members 21 and 37, and the sun gears 24 and 38 are connected to the input side of the fluid torque converter W thru gears 25, 39, 41 and 42 and a differential gear assembly D which provides steering effect but has no resultant action directly upon the aforesaid torque dividing operation.

The annulus gears 18 and 33 are cross-connected thru drum flanges of central shaft 40 and are driven by the output member O of the fluid torque converter unit W.

For neutral drive, this connection is interrupted as will be explained in detail further.

The construction shown in FIG. 1 has engine shaft 1 furnishing input power, geared at 3, 4 to hollow input shaft 5. The two output sprockets or load members 21 and 37 are each driven from adjacent final drive planetary gear units. The shaft 5 delivers power to the carrier members 6 of the centrally located differential gear unit D, and simultaneously to the impeller I of a fluid torque converter W, the output member O of which is fixed to hollow shaft 7.

At the right of FIG. 1 shaft 7 is attached to sun gear 12' and at the left to sun gear 12, these sun gears acting as power input drivers for the combining and reduction ratio units. Nested inside shafts 5 and 7 is shaft 40 attached to carrier 28' of the low gear unit, to annulus gear 33 of the adjacent final drive output unit, and at the left by a drum 17 to annulus gears 16 and 18 of the reversing and final drive units adjacent shaft 21.

The combining output gear group 33, 34, 38 at the right, drives carrier 35 and output sprocket 37 as a final drive unit, while combining output group 18, 19, 24 at the left drives carrier 20 and sprocket 21 similarly.

The reduction gear group 29, 27, 12' provides low gear and coupled direct drive to shaft 40 from shaft 7, and the reverse gear group 16, 13, 12 provides reverse gear drive to shaft 40 from shaft 7.

The gear groups 18—19—24 and 33—34—38 should be regarded as torque-combining variable ratio gears, and the shaft 40 with drums 17 and 28 may be thought of as the cross-coupling input means for the torque-combining gears, while the combination 29—27—12 is the low reduction group and the combination 16—13—12 is the reverse reduction group. The clutch 30—31 drives the coupling shaft 40 at unit speed with shaft 7, when energised.

The line of drive from the unit W therefore consists of final torque combining groups driven by change speed groups. Since the member 40 is the means for providing equal coupling to the annulus gears 18, 33 of each of the torque-combining groups, it is called the coupling or cross-coupling member.

It is believed novel to divide the direct, forward and reverse groups in the manner shown. This feature yields advantages in distribution of weight, bearing loads, and in assembly arrangement for low differential speeds between adjacent rotating elements, as well as in the coordinate distribution of the torques.

The output sprocket drive members 21 and 37 are connected to and driven by the output unit carriers 20 and 35. The sun gears 24 and 38 of these units are driven from the power steering differential unit D, and the annulus gears 18 and 33 from the fluid torque converter W and connected gear train.

In straight, non-steering drive, the secondary shafts 36, 55 geared to drive the output unit sun gears are coupled for unit rotation by the friction clutch C, and the power steering differential annulus gears 49—49' rotate at the same speed and in the same direction, causing the planet pinions 52 to stand still, and their carrier 6 to couple the turbine output member O to both annulus gears 49, 49' at unit speed and rotation.

The engine-connected shaft 1, bevel geared at 4 drives the input shaft 5 which rotates the turbine impeller I and the power-steering differential carrier 6. This divides the engine torque thru the turbine W and the power steering differential train coupled to the sun gears 24, 38 of the output units.

The intervening solid shaft 40 cross-connecting the output units is attached thru drums 17 and 28 to the annulus gears 33, 16 of both output units. With one component of torque applied thru the secondary shafts 36, 55 from the steering differential D to the sun gears 24, 38 of the output units, and another applied from the fluid turbine W and gearing to the annulus gears 13, 33 thereof, the carriers 20, 35 of the output units will revolve at a differential ratio of the components received, which will vary in accordance with the load and speed conditions, and drive unit characteristics.

The drive is initiated by locking of low gear brake 45 to stop rotation of annulus gear 29. Assuming that the converter W may deliver a torque to sun gear 12' this torque is applied to carrier drum 28' of shaft 40, on the one hand, and is also applied thru shaft 7 to sun gear 12, the annulus gear 16 of drum 17 being driven. The component of this torque is applied to drums 17 and 28' of shaft 40, and consequently to annulus gears 18 and 33. Simultaneously shaft 5 is driving carrier 6, planet pinions 52 and annulus gears 49, 49' of the power steering differential D at input speed, and the teeth 48 and 48' of the annulus gears are rotating gears 43 and 44, drums 55' and 57, shafts 55, 36 and gears 41, 42, the latter elements revolving in the same direction at the same speed.

Consequently output sun gears 24 and 38 deliver the same torque fraction to the output units, and the output carriers 20 and 35 receive equal combined torques.

For straight-ahead running, shafts 55 and 36 rotate together at the same speed, assuming the tractive efforts on sprocket drive members 21 and 37 are the same, since clutch C compels them to do so. While it may seen possible to omit cluch C, on the assumption that variation is right and left drive tractive effort could be compensated for by the differential action in unit D, it must be remembered that over uneven ground, if the arrival of one side at a point where traction is less permits differentiation, the passing of the same side to firmer ground could inroduce a yawing tendency opposite in steering effect to that first experienced. The clutch C therefore couples the power steering train and its path of torque evenly to both output units, while the other path thru the torque converter W and its gearing trains is likewise evenly coupled.

At above a desired given speed, the clutch 30—31 is locked, and the turbine output shaft 7 rotates the shaft 40 and annulus gears 18 and 33 at turbine output speed.

The recombining of divided torque in the output units is readily understood, as resulting from additive or subtractive components created in each unit by sun gear and annulus torque producing a resultant summation torque on the output carriers 20 or 35 and members 21 or 37.

For all practical purposes shaft 40 and drums 17 and 28 serve as the first train input members for the torque combining groups for each track driver.

The variable speed gear assembly of the first train consists of torque converter W receiving power from shaft 5 and gear 4, and delivering same to the cross-coupling shaft 40 acting as the output element of the separated forward and reverse reduction groups driven by shaft 5 thru sun gears 12 and 12'.

The one-way clutch F coupling shaft 5 to sun gear 12, acts to by-pass the torque converter W and couple shaft 7 to shaft 5 when there is vehicle motion or rotation of shaft 7 with no motion, or a lesser speed of shaft 5. This assures that shaft 7 will not ever exceed the speed of shaft 5, and enables the operator of a vehicle to obtain a towed start of a stalled engine, for example.

While it would be possible to place clutch F so as to couple shaft 40 to shaft 5 on the overrun at 1-to-1 ratio, it must be remembered that shaft 40 is required to be driven reversely, so that lockout means for clutch F would be needed, to permit this reverse rotation of 40 to 5. The positioning shown in the figures herewith is simple and requires no auxiliary lockout since the point of torque conversion for reverse drive lies beyond the intermediate coupling of shafts 5 and 7 by the clutch F.

While it is appreciated that the prior art shows one-way clutches arranged to by-pass variable speed ratio drives and to couple output to input at 1-to-1 ratio on the overrun, the problem herein solved is to utilize this effect for by-passing a torque converter combination which may have low overtaking torque efficiency, and doing so in the intermediate connection to the step ratio variable speed gearing of the train, in order to retain steering stability control on downhill runs.

The overall driving train herein shown provides a powerful low speed ratio reduction range, and since such drives under overtaking torque endeavor to speed up input driving elements to extremely high overspeeds, the drive system must be protected against the possibility of unrestrained run-away, as well.

Assuming the installation to be in a military tank and running on a down grade at considerable speed, if the fluid of the torque converter W were suddenly drained as may occur in battle from an enemy shot, the momentum of the vehicle would no longer be restrained by the reverse drag of the torque converter W, and the reverse step-up in ratio thru the gear units to shaft 5 would not be loaded or restrained by engine braking. Clutch F therefore acts to couple the converter-connected shafts at 1 to 1 before damaging high speeds under reverse torque are reached.

If such a mishap occurs when one of the reaction brakes is energised, instead of at a time when clutch 30—31 is engaged, the spinning speeds of the planet gears of the assembly could reach damaging velocities, and the same would be true of a mishap to the controls for the low and reverse brake bands 45 or 51, respectively.

The brakes 50 and 46 for the respective output carriers 20 and 35 of the torque combining units enable the operator to stop the motion of either of sprockets 21 or 37, together or selectively.

Carrier 20 being stopped, for example, by brake 50, the rotational component applied to drum 17 by shaft 40 is transferred thru planets 19 as a reverse component to sun gear 24 and gear 25, the latter rotating gear 41 shaft 55 in the same hand of rotation as drum 17. This rotation is transferred to gear 44, which rotates crown gear 49 and reacting thru gear 52, speeds up gear 49'.

Assuming normal forward drive, the carrier 6 of the differential unit D would rotate clockwise as viewed from the left, but gear 49 would be in opposite rotation. Clutch C is disengaged for this action.

Since the carrier 6 has forward clockwise motion and the gear 49 has reverse rotation thereto the gear 49' revolves with a resultant motion at increased speed in the same hand of motion as shaft 5. This transmitted thru gear 43, shaft 36, gear 42, to sun gear 38 adds a differential component to the coupling of the combining unit 33—34—38 greater than was obtained thru normal operation, so that the sprocket drive member 37 may be rotated faster.

This action causes the vehicle to pivot or steer about a point adjacent the stopped member 21, and causes the other tread to advance faster.

In reviewing this peculiar relationship of elements, one should consider member 21 and carrier 20 of the output unit at the left of FIG. 1 stopped by brake 50, while the carrier acts as a reactor, so that torque may be transferred between sun gear 24 and annulus 18. If the gear unit at the right is in low gear, and the steering brakes 50, 51 are inactive, shaft 7 drives the annulus gear 33 at a reduction consisting of the variable ratio of the unit W multiplied by that of the right-hand gear unit, while the normal component derived thru the rotation of the unit D is capable of being transferred to shaft 36, gears 42, 39 and sun gear 38. However, since shaft 40 is driving the other output unit annulus 18 at the same speed as annulus 33, the sun gear 24 instead of having a fixed ratio forward component derived from D, is now urged backward at an overspeed ratio by rotation of annulus 18.

Assuming this torque increment is transferrable to unit D, the differential transfer gear 48 would endeavor to rotate backward while the normal rotation of unit D would be urging the piece 47, 48, 49 to rotate forward. The clutch C being locked or engaged, no differential motion in unit D could take place. If clutch C has sufficient braking capacity, the reaction of the couple would then have the effect of braking drum 17, shaft 40, drum 28 and hence rotation of shaft 7, so that the net result of applying only one output shaft brake such as 50 would be to brake the whole forward motion of the vehicle, without steering effect.

Now if clutch C be released, and brake 50 be applied, the backward rotation of member 47, 48, 49 would be transmitted across pinions of the differential unit D, and member 47', 48', 49' would tend to rotate forward faster than differential carrier 6 and shaft 5. This speeds up the steering torque delivery shaft 36, gears 42, 39 and sun gear 38 of the left-hand output unit, so that a sharp steering effect is immediately obtained, by reason of the stopping of the member 21 which establishes a pivot for the vehicle, for the fulcruming action of the increased speed of carrier 35 and member 37.

It should be remembered, in studying this mechanism that the normal slowing of member 47', 48', 49', for example, by steering device B, also slows the rotation of gear 43, shaft 36, gears 42 and 39 and sun gear 38, tending to cause the vehicle to steer toward that side of the vehicle.

The odd dual effect obtained by applying one side brake, like 50, to stop one output element directly while accelerating or speeding up the drive to the other side output element, by merely opening a cross-connecting clutch, is believed entirely new in this art.

The power steering path of torque begins with the shaft 5 driving carrier 6 of the differential unit D. The gears 49, 49' are meshed with the planet gears 52 and have external teeth 48, 48' meshing with differential output gears 43, 44. The divided shaft 36, 55 turns the gears 41, 42 in the same hand of rotation, but of opposite hand to the rotation of shaft 5, and of gears 25, driving the sun gears 24, 38 of the output units.

The drums 47, 47' of crown gears 49, 49' extend radially and laterally where steering brake effects are applied to graduate the retardation required to obtain the desirable steering effects.

Figure 3:
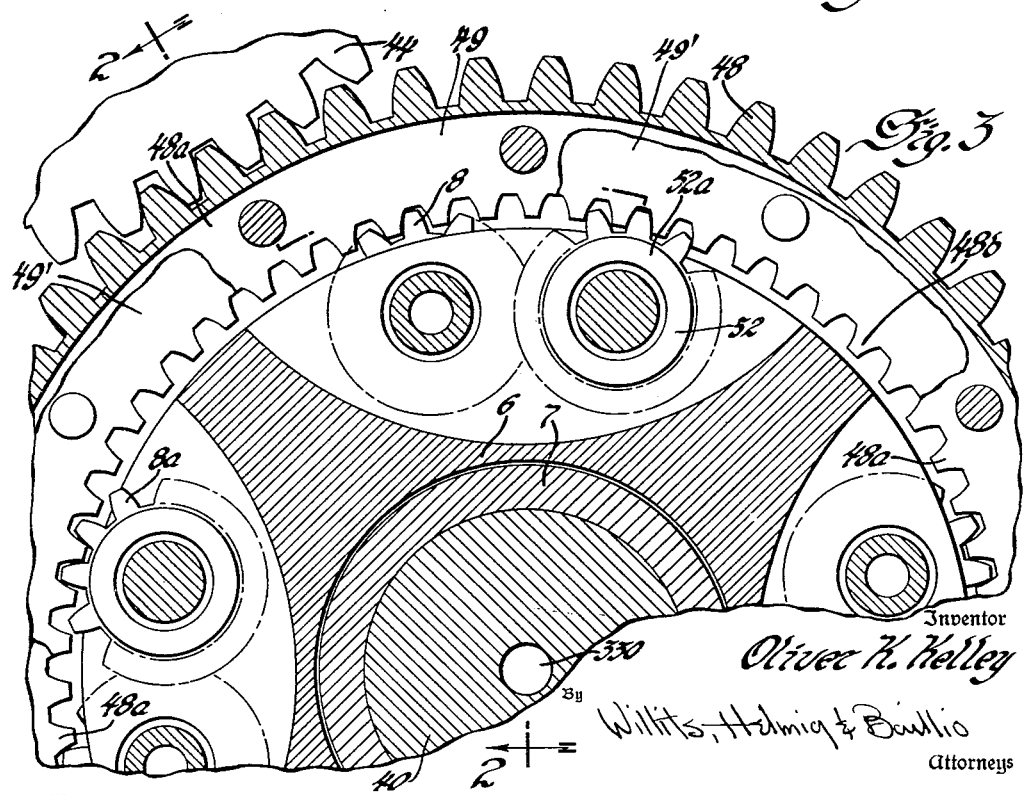
FIG 3 is a part section taken at 3—3 of FIG. 2 to show the relationships of the differential gear elements.

FIGS. 2 and 3 may be consulted at this point to clarify the action of the differential mechanism. The steering devices A and B for the composite members 47, 48, 49 and 47', 48', 49' are shown in part detail in FIG. 2, the plates 61 being splined to rotate with part 47, and the plates 62 being attached to part 60 of the casing. The prime member parts at the right of FIG. 2 are similarly attached.

Disregarding for the moment the power steering effect and assuming that the shafts 36 and 55 are driven together at unit speed from the engine by shaft 5, differential carrier 6, crown gears 49, 49' and coupling gears 43, 44, the fluid torque converter output member O may drive hollow shaft 7, and assuming that the sprocket-shaft carriers 20, 35 are under equal torque and tractive load, the coupling pattern of the gearing requires that when either of bands 45 or 51 are energised to hold their drums 29' or 15, the reaction established by annulus gear 29 or carrier 15 compels the input power to be expressed as driving torque.

With band 45 locked for low gear drive, the carrier 28' and shaft 40 are driven in the same hand of rotation by sun gear 12' at a reduction ratio, while in the other output unit drum 17 and annulus 18 are rotated equally and similarly since they are connected by shaft 40.

The torque converter W may then be operated over its useful torque multiplying range, multiplied further by the reduction ratio of the output units. If the input sun gears 12 and 12' of the output units could be held against rotation, the annulus gears 18 and 33 would drive the carriers 35 and 20 at a fixed reduction. However, the power steering train is providing a fixed ratio drive from engine connected shaft 5, in the same hand of rotation, as will be obvious from a tracing of the rotations of the train elements.

Assuming that the differential unit D transmits power equally to the sun gears 24 and 38 of the two output members 21 and 37, and since the annulus gears 18 and 33 are connected by shaft 40, the drive operation in low gear proceeds by clamping brake band 45 on drum 29' of annulus gear 2 which causes carrier 28' and attached annulus gear 33 to rotate at a reduction ratio, which rotation would be transmitted to carrier 35 of output member 37 by whatever reaction or rotational component is applied to sun gear 38 from the mechanical train composed of the shaft 5, differential group 6, 49, 48, 43, shaft 36, gear 42 and gear 39 driving the sun gear 38.

The engine power applied to hollow shaft 5 divides one component passing thru the torque converter W to shaft 7, sun gears 12 and 12', final drive annulus gears 18 and 33; the other component passing thru the differential group D to shafts 36, 55, gears 41, 42 and gears 25 and 39 coupled to the final drive sun gears 24 and 38.

The application of clutch 30—31 with release of band 45, couples annulus gear 29 with sun gear 12', compelling shafts 7 and 40 to rotate together, which places a similar couple across annulus 16 and sun gear 12 of the reverse gear group, so that the speed of fluid torque converter output member O is applied to annulus gears 18 and 33 equally, the sun gears 24 and 38 receiving their components from the differential group D, shaft 55, 36, gears 41, 42 and 25, which latter drive the sun gears equally.

Alternate actuation and operation of clutch 30—31, with brake band 45 provides two ranges of forward speed ratios, entirely sufficient for all the needs of a large heavy vehicle.

To enable one to visualize clearly the relative rotational components of the various elements involved in this drive, the FIGURE 1 should be re-examined for the fact that the combined torque components for forward drive in the final output gearing are both of the same rotational hand as that of input; that is, the hands of rotation of shafts 5, 7, 40, of sun gears 24 and 38 and of output carriers 20 and 35 are the same.

The known prior art does not explain the utilization of the dividing torque principle in differential power drives, not does a general knowledge of this appear to be known in engineering practice or text books, hence it is believed proper herein to dwell at some length on it, that the invention may be properly and clearly understood.

Referring back to the conditions under which divided torque is obtained in low gear, it may be stated that the output unit sun gear 24, and ring gear 18 which participate in the recombing of the torque should have equal tooth loading under all drive conditions, and that the variable speed ratio torque path delivers a multiplication of approximately 3.5 to 1, in the present example, as shown, to the ring gear 18.

For ease of calculation, the tooth load times the pitch radius represents torque. The ratio of the gears 18 and 24 is 2.5 to 1, therefore annulus gear 18 is always loaded 2.5 times more than sun gear 24. The speed ratio of the differential drive mechanical connection between sun gear 24 and the converter input shaft 5 is about 7 to 1, therefore the incoming torque is that of the sun gear divided by 7, while that of the annulus gear is 3.5 times greater because of the torque multiplying planetary gear between the converter output member O and the annulus 18.

The torque converter output and input torques are related by a factor R which varies with output speed, therefore the annulus gear torque depends on this factor, and upon converter output speed.

For clarity this statement may be set up as an equation:

Converter input torque on shaft 5

$$\text{EQUALS} \frac{2.5 \text{ sun gear torque}}{3.5 \text{ converter ratio factor R}}$$

The mechanical fraction of the input torque is:

$$\frac{\text{Sun gear torque}}{7}$$

Adding the hydraulic to the mechanical fraction must produce a torque equaling that of the engine; therefore—

Engine torque $$\text{EQUALS} \frac{2.5 \text{ sun gear torque}}{3.5 \text{ converter R}} \text{ PLUS } \frac{\text{sun gear torque}}{7}$$

Since sun gear torque divided by 7 equals the mechanical torque, one can write:

Engine torque $$\text{EQUALS Mechanical torque} \left( \frac{17.5}{3.5 \text{ converter R}} \text{ PLUS } 1 \right)$$

and therefore the expression for the percentage of input power carried by the differential mechanical path is:

$$\frac{\text{Mechanical torque}}{\text{Engine torque}}$$

$$\text{EQUALS} \frac{3.5 \text{ converter ratio R}}{17.5 \text{ PLUS } 3.5 \text{ converter ratio R}}$$

It should be understood that this disclosure is based on the mechanical dimensions and factors and only by way of example, and only serves to show the steps of reasoning by which the useful results are achieved.

Upon being given the torque multiplication ratios of the torque converter for the different output speeds, one may thereupon by the above process determine the percent of the divided torque going thru the two paths.

The overall efficiency obtained on a speed chart is a flatter curve than with other comparative drives, and the corresponding engine speed characteristic has an increasing upward slope. The percentage of torque taken by the mechanical drive, in the example herewith given will vary between 15 and 50 percent, actually experienced.

When the clutch 30—31, is engaged for the "high" forward drive, the 3.5 to 1 ratio train between converter output shaft 7 and the final drive units at the left and right of FIG. 1 is locked in "direct" drive. By this shifting or changing of the relative speed range, the percentage of divided torque is transferred to a different scale in which the percentage of the torque thru the mechanical train will vary between 22 and 5 percent.

This relationship of the divided and recombined torque factors is operative only in the two forward speed ratios.

When reverse band 51 is applied to carrier drum 15 for planet gears 13, the divided torque factors are reversed, and instead of the input power being divided into two paths, the arrangement produces the unusual effect of increasing the drive input torque to a higher value than that being developed by the engine.

An analogy of this would be in a self-energized brake mechanism in which the brake anchor or reaction force may be re-applied thru linkage to increase the primary energizing forces.

In FIG. 1, the band 51 holding drum 15, the reverse gear group 16—13—12 applies a reverse rotational component to annulus gear 18. If member 21 is not rotating, the sun gear 24 would rotate forward at 2.5 times the speed of the gear 18, which thru the 7 to 1 ratio of the gearing train 25, 41, 44 rotates the torque converter input shaft 5 at 17.5 times the speed of the annulus gear 18, or 7 times faster than the speed of converter output shaft 7.

Therefore, with the vehicle not in motion, the torque converter output shaft 7 is rotating "forward" at one-seventh of input speed and the energy represented by this rotation of shaft 7 is fed back to the torque converter input shaft 5 through the same gearing which in forward speed drive provided a recombining of torques.

This novel result is not mere text-book theory, but represents actual mechanical results proven by test instrumentation, as well as by successful operation of large vehicles on the road.

This exact percentage of feed back or return flow of torque to input may be calculated:

$$\frac{2.5 \text{ torque converter output torque}}{2.5 \times 7}$$

$$\text{EQUALS} \frac{\text{torque converter output torque}}{7}$$

Since the converter speed ratio is 7 to 1, the torque ratio is determinable from experience tables, which show that it is approximately 3.8 to 1, therefore— torque converter output torque EQUALS 3.8 torque converter input torque and it follows that:

torque converter input torque
MINUS torque converter feed back torque
EQUALS engine torque Since torque converter output torque divided by 7 equals the feed back torque, it follows that:

7 times feed back torque EQUALS 3.8 times torque converter input torque or expressed another way:

torque converter input torque $\text{EQUALS} \frac{7}{3.8}$ times torque converter feed back torque torque converter input torque EQUALS 1.84 times torque converter feed back torque Having obtained a proportionality for the relationships between torque converter input and feed back torques, one may then find out what the feed back value is, in terms of initial engine torque.

Having above, that:

torque converter input torque MINUS torque converter feed back torque EQUALS engine torque we can substitute:

1.84 times torque converter feed back torque MINUS torque converter feed back torque EQUALS engine torque therefore:

.84 times torque converter feed back torque EQUALS engine torque and rewriting this:

torque converter feed back torque EQUALS 1.19 times engine torque

This odd effect therefore results in inducing an increased input torque, producing a higher torque converter input speed and input torque which causes a higher incremental value of converter output torque, creating the anomaly of having a net reverse speed reduction ratio of only 2.5 to 1 as against 3.5 to 1 in forward low ratio, yet the reverse drive output torque is higher than that in low gear ratio, because of this feed back action.

Straightway forward, driving results in the steering differential mechanism D rotating as a unit since the right and left tread force reactions are equal, and exactly divided by the differential action.

The steering brakes are not energized for straight driving. Clutch 54—56 being normally engaged, shafts 36 and 55 deliver equal torques to the final drive output gear units, hence the output shaft speeds to the tread sprockets are exactly equal to each other, and equal in summation to the combination ratios provided by the fluid torque converter drive path and that thru the mechanical train.

Application of one of steering brakes A or B by energization of the steering servo mechanism stops the rotation of the mechanical system driving one tread sprocket shaft, and doubles the speed to the other sprocket shaft.

When this occurs at a time when the fluid torque converter speed is low, the proportional and resulting steering effect is fast and the turning radius is short, whereas, if at high converter speeds, the resulting turning radius is expanded so that proportionally steadier steering is provided for high speed travel as against steering at low speeds by quick maneuvering with a short turning radius.

This effect of continuously variable steering radius increasing with drive speed is believed of exceptional novelty and utility in providing very accurate steering for large heavy vehicles under all drive surface and gradient conditions.

Common forms of slipping brake controls in this field of art are notorious for high energy dissipation requirements, and in the present invention, the matching of the drive characteristics of the units described herein produces a "locked drum" steering sequence which avoids need for excessive brake energy dissipation. It should be noted that regardless of vehicle speed, the speed effect derived thru the mechanical differential drive path is constant with constant engine speed, while that derived thru the hydraulic drive path is proportional to vehicle speed, since at constant engine speed the only other permissible variable in the over-all drive is the vehicle speed.

A further useful result herein is the fact that when the output members 21 and 37 are non-rotating, vehicle stopped, the application of one of the steering differential brakes A or B results in one tread being driven forwardly and the other reversely, which causes pivoting of the vehicle on its own center. In military practice, this feature is of exceptional value in enabling the tanks to reverse direction in a narrow space, and it adds also to operating facility in agricultural and dirt moving machinery.

FIG. 4 shows a hydraulic actuator for low band 45 which mechanism is also used for actuating reverse band 51. The band is pivoted at 77 to strut piece 78 supported in casing 100 by adjustable stud 79 and nut 80. The movable end of the band is pivoted at 76 to strut 75 fitting a notch or recess in lever 73 pivoted to the casing at 74. The lever 73 carries pivot 72 for link 71 of piston rod 70a of piston 70 operating in cylinder 68 formed in the casing. Fluid pressure is admitted at 81 to hold or push piston 70 against spring 69, and pressure on the opposite face of 70 is admitted to and released from cylinder 68 thru passage 82.

The valve control system for the hydraulic servo action is shown in FIGS. 9 to 20 inclusive, and described further herein.

The brake control of FIGS. 5 and 6 pertains to the operation of the vehicle brakes 46 and 50. When these brakes are applied, it is desirable that cooling lubricant be flowed at considerable velocity over the braking surfaces.

Band 46 is energized by pivoted strut 83, notched arm 84, link 85, rocker arm 86, shaft 87 and external lever 88 supported in casing 100.

The lever 86 is rocked clockwise to energize brake 46.

Main pump line pressure from the oil cooling system is connected to pipe 90, and pipe 91 is connected to an opening between the band 46 and drum 28. The valve plug 92 is recessed to hold pressure in line 90, and to withhold it from pipe 91, and is held normally in the position shown when brake 46 is not applied. Projection 86a or arm 86 registers as shown, until lever 88 causes arm 86 to swing for energizing band 46. Pressure in 90 thereupon moves valve 92 to the right, uncovering the upper end of pipe 91, so that cooled oil flows to the space between band 46 and drum 28. When external lever 88 is moved to release brake 46, the projection 86a forces valve 92 to the left, covering the end of pipe 91, stopping the flow from pipe 90. This device provides brake cooling when it is needed, during the actuation period, and shuts it off when the cooling capacity is required in some other group of the system.

FIG. 7 shows the divided shafts 55 and 36 coupled by clutch C in a somewhat different space relationship of the parts of FIG. 1. In FIG. 7 shaft 55 is splined to drum 53 with which plates 54 rotate and external drum 57 splined to shaft 36 carries plates 56 mating with plates 54.

Th clutch C of FIGS. 1 or 7 is for the purpose of maintaining an equivalent torque on both output sprocket drive members at all times except when a steering action is desired.

In FIG. 7 is shown the clutch assembly with plates 54 and 56 connected to drums 53 and 57 of shafts 55 and 36 respectively. Cylinder 64 is connected with passage 65 in shaft 55 as indicated by the broken lines in this figure. The piston 63 in cylinder 64 is moved by pressure in passage 65 against a set of common disengaging springs, not shown. The clutch arrangement is concentric with shafts 55 and 36. The fluid pressure in passage 65 is controlled by valve 220, FIG. 16 which maintains pressure in cylinder 64 on piston 63 at all times except when one of the steering controls is moved to cause a steering effect. The method of steering control is described further in detail below, in connection with FIG. 16 and in a further system modification, in FIG. 17.

FIG. 7 shows a bevel gear differential system in place of the spur gear unit of FIGS. 1 to 3, and also shows a modified steering brake discussed in detail below in connection with FIGS. 9 and 10, pertaining to steering method. The drums 47 and 47' are splined to the axial sleeves of differential members 48 and 48' which are in turn toothed externally to mesh with gears 44 and 43.

FIG. 8 is a detailed view of the right hand portion of FIG. 1, modified by the substitution of a disc brake construction for the band brakes of FIG. 1 for the vehicle.

In FIG. 8 modification, a friction disc brake 102, 103 is substituted for both the band brakes 46 and 50 of FIGS. 1 and 5, other novel features appearing. The output turbine O of the converter W is connected to shaft 7 thru splining, which shaft is shown integral with sun gear 12 and clutch drum 30a for plates 30. Planet gears 27 meshing with 12 mesh externally with annulus gear 29 and are supported on pins 27' of carrier 28', fixed to annulus gear 33 meshing with planets 34. Planets 34, supported on pins 34' of carrier 28, mesh internally with sun gear 38 attached to gear 39. Carrier 28 is attached to sprocket wheel shaft 37' to drive same. Drum 29' of annulus gear 29 supports plates 31 mating with plates 30 and is formed to make a cylinder 217 for presser piston 215. The external rim of drum 29' is surrounded by brake band 45 as in FIG. 4, which is actuated by the mechanism described in connection with FIGS. 4 to 6.

In FIG. 8 the drum 28 is splined externally to carry matching teeth of friction discs 102 mating with discs 103 splined to fitting 104 attached to the casing 100, a piece 104' acting as the backing plate for the stack of discs. A pressure plate 105' splined to fitting 104 is attached to overhanging member 105 having a radial flange for taking endwise thrust from springs 106 seated in a recess of fitting 104. Ring 107 is anchored in channel 108 between the overhang of fitting 104 and member 105, and may transmit thrust to the adjacent loose ring 109 thru a ring of bearing balls 109'.

The second ring 109 lies in the channel between fitting 104 and member 105, to the right of ring 107, and is fitted with a short arm 99 rocked externally by appropriate controls.

The facing radial surfaces of rings 107 and 109 are machined into ovoidal section recesses, not numbered, in which balls 109' are mounted, so that when relative rotation between the rings occur, the balls 109' ride into the shallower portions of the ovoidal section recesses, and exert an axial thrust tending to press ring 109 to the right to shift fitting 105 to the right against springs 106 thereby shifting plate 105' to clamp the plates 102 and 103 together. This form of loading mechanism provides a high degree of mechanical advantage for energizing the braking action for stopping shaft 37' and sprocket drive member 37, in obtaining a pivotal steering action for the dual tread vehicle, or for actual braking of the vehicle's drive motion.

The clutch plates 30, 31 of FIGS. 1 and 8 are released by springs, as shown, and are clamped by piston 215 against the opposing flange of the drum 29' of annulus gear 29. Piston 215 is recessed in cylinder 217 formed in the drum 29' and better shown in FIG. 8. The fluid pressure feed to cylinder 217 is from passage 218 (FIG. 8) in the casing of converter W to a groove and axial passage 219 in the sleeve of shaft 7 leading to a groove registering with passage 214 in the sleeve of drum 29', the passage 218 being shown in full line in FIG. 1 and in dashed line in FIG. 8. The pressure control system covering the pressure feed to the low and high range drive servo cylinders of FIGS. 1, 4 and 8 is shown further in connection with FIG. 14.

Lubricating fluid from the pumping system is fed by connecting passage 252, FIG. 1, to central passage 238 in shaft 40, continuous with passages 258' in carrier shaft 37' as shown in FIG. 8. Radial passage 292, axial passage 293 and diagonal passage 294 feed lubricant to the gear group 12—27—29, and radial passage 295 delivers it to the bearings of planet gear 27. Similarly, an unnumbered passage delivers oil from passage 258' to the spindle 34' of planet gears 34. Spent oil flows back to the sump as understood further in examination of FIG. 14.

Referring back to FIGS. 2 and 3, passage 330 in shaft 40 may be continuous with passage 258 of FIG. 8, and feed lubricant thru intersecting radial passages 331, grooves 332, and passages 333 in shaft 7 to channels 334 formed in the inner radial portion of carrier 6 for the differential gearing lubrication.

The general lubrication system is amplified in the discussion of FIGS. 14 and 17.

FIGS. 9 and 10 show the mechanism for operating the differential steering valves 170 and 171 to control the feed to the steering brake actuators of FIGS. 1, 2 and 14.

In the preceding drive description the mechanical steering effects obtained by graduated braking of differential members 47 and 47' were described. Fluid pressure cylinders 58 and 58' formed in the non-rotating members 60 and 60' of FIGS. 1 and 2 enclose annular pistons 59 and 59' respectively. Feed passages 172 and 173 of FIG. 1 connect the cylinders 58 and 58' to the ports 174 and 175 of the steering valves of FIG. 10.

In FIG. 10 the valves 170, 171 lie in parallel bores 176 and 177, each valve having two end bosses e and f and protruding stems 178 and 179.

Mounted on the stems 178 and 179 are slidable spring seat collars 181 and 182 which are secured on these stems by unnumbered lock rings.

Shaft 180 located and supported in valve body 200 at right angles to the plane of the valve bore centers, is fitted with a rocker plate 184 having fingers 186 and 187 at either end registering with a channel in the slidable spring seat collars 181 and 182.

The external arm 188 is held on shaft 180 by a serrated section and nut, and carries roller 189 for coaction with external mechanical controls. Seal plugs 191 permit removal for valve repair or adjustment.

Each bore 176 and 177, is equipped with three ports, in order from left to right, exhaust, clutch feed and main line delivery. The middle port 174 for valve 170 connects to the cylinder 58 of steering brake A for variable braking of member 47 of FIG. 1, whereas the middle port 175 for valve 171 connects to the cylinder 58' of steering brake B. Each valve is centrally drilled from the blind end of boss f at the right to a point to the left of that boss, and the narrower neck portion is cross-drilled at 194 and 195 to connect the spaces between the bosses to the bore and spaces 196 and 197.

In the vertical position of rocker plate 184 both exhaust ports 198 and 199 are connected to ports 174 and 175 open to the actuator pressure feed passages 210 and 211 and leading to cylinders 58 and 58' as in FIG. 2 and the bosses f seal the pressure inlet ports 201 and 202.

Rocking of the rocker plate 184 clockwise tends to shift boss e of valve 171 to the left to open the exhaust port 199 wider, while valve 170 is moved to the right to close exhaust port 198 and open pressure delivery port 201 to the steering brake feed port 174 and to line 210, of FIG. 14 for clamping plates 61, 62 of FIG. 2 to slow down rotation of differential member 47 of FIG. 2, for the desired steering effect.

The valve action will be described for valve 170, in which the linear spacing between bosses e and f is so taken with respect to the spacing of the ports 198 and 201 that a very close control over the pressure acting in the cylinder 58 of the piston 59 being actuated, is obtainable. The cross-drilling 194 connected to end space 196 has the effect of metering a proportional fraction of the line pressure to the space 196 behind the valve, and since the interior pressure between the bosses is equalized to prevent direct axial force on the valve, the end-space pressure over the end face of the valve provides a force proportional to valve cross-section area tending to shift the valve away from feed actuation toward the left, in which it will occupy the position shown in the drawings herein.

In other words the valves 170 and 171 tend to unload the steering differential brakes automatically.

However, the operator's control consisting of arm 188 of shaft 180, worked by external mechanism coacting with roller 189 pinned to the arm 188, applies a force acting thru calibrated springs 203, 204, the force pattern providing a range of equilibrium points in the motion capable of being felt as a small variable reaction force on the operator's control arm 188, so that in steering the vehicle, the operator is able to maintain a very smooth, tactile adjustment on the steering valve action. It is believed novel to provide pressure reaction feel in control devices for manual valves which regulate the differential steering of drive mechanisms such as described herein.

The resulting self-compensation between spring-force, valve position and net pressure in end space 196 provides automatic adjustment of the net steering brake pressure.

It is not deemed necessary to describe the opposite steering action by which valve 171 regulates the actuation of differential actuator B for member 47' of FIG. 2. The overall control diagram of FIG. 14 will be better understood by reference to FIGS. 9 and 10.

Auxiliary cooling for the steering brakes A and B is provided for, one method being shown in which the pressure passages 172 and 173 of FIG. 14 are connected to jet passages 322 and 321 respectively; delivering to a pair of jets 318, 321 one for each steering brake. This method provides additional cooling flow during all intervals when the steering brakes A or B are under fluid pressure actuation. A second method in which the cooling flow is taken from a lower pressure portion of the supply system is shown in FIG. 17.

FIG. 17 shows a modified form of steering differential in which a bevel gear replaces the spur gear differential of FIG. 2; in which the straight drive clutch 54, 56 is shown nested inside the compensator gears 43 and 44 between shafts 36 and 55; and in which the differential steering brake members 47 and 47' are braked by electrical means.

In my Patent 2,585,790 referred to, is shown a schematic electrical steering control in which appear a simple divided resistance circuit connecting each resistance half with a corresponding electrical braking coil which receives an increased current with steering angle, from a source of electrical power, as controlled by a selective resistance arm, manually operated. In that disclosure, the energising current is delivered thrus a governor-operated switch which cuts off the steering current at below a given governor speed, but the governor switch may be by-passed by a manual switch if it is desired to utilize the electrical steering action under speed conditions wherein the governor would have interrupted the power steering circuit. The manually-operated steering contactor arm of the Patent No. 2,585,790 disclosure may be used as a cut-off switch by being placed in the non-steering middle position temporarily, and further, the governor of that showing may be replaced by a simple manual switch. The field magnets are designated by numerals 67 and 67' in FIG. 7.

Present reference to the copending application showing is to provide adequate means for steering control by the modification structure of FIG. 7.

In that figure, the drums 47 and 47' rotating with the members 48 and 48' serve the same purpose as drums 47 and 47' of FIG. 2. The field coils 66 and 66' respectively supply actuation energy for brakes A and B. For steering braking of differential member 48 coil 66 is energized, generating a magnetic flux of proportional value in the plural pole assembly resulting in a braking of drum 47, since the assembly inside which coil 66 is mounted, is bolted to an extension 100d of the casing, as shown. This braking method is old and well-known in the art as eddy-current braking.

This phenomenon is obtained in squirrel-cage induction or in synchronous motors, designed with salient poles and D.C. excitation, the squirrel-cage member being usually a solid iron or steel drum or cylinder as a rotor in which the eddy currents are induced. The D.C. excitation is used to obtain smooth adjustment of the torque capacity, which decreases at lower speeds.

In the FIG. 7 showing the drums 47 and 47' are the iron or steel rotors, in which the eddy currents are induced, proportional to the current selectively applied to cores 66 and 66'. Since the desired steering effect is more gradual than a direct stopping effect for other than emergency fast pivoting steering, the electrical method is adapted to provide a fine control of net steering over a considerable and wide turning range. The structural nesting of the differential gearing, the split-torque delivery gearing 43, 44 and the steering brakes A and B of FIG. 7 demonstrates an advantageous feature of the modification showing. Jet cooling of drums 47 and 47' is described further in detail below.

It is not thought essential to reproduce herein the above-noted FIG. 3 of my previously mentioned Patent 2,585,790, for a comprehension of the full utility of FIG. 7 of the present disclosure.

FIG. 11 should be oriented with the diagram of FIG. 14.

In FIG. 11, valve 110 is shown located in a sectioned portion of valve body 200. The external end of the valve 110 is moved by arm 111 of shaft 112, thrus pin 113 intersecting two bosses of the valve, so as to convert rotation of shaft 112 to rectilinear movement of the valve 110. The FIG. 12 view clarifies this motion coordination. Arm 112' of shaft 112, with roller 141 coacts with the operator's control.

For ease in identifying the parts, the bosses of the valve 110 are lettered from top to bottom as a, b, c and d. As shown in FIG. 11, the bore 114 for valve 110 in body 200, is intersected by port spaces numbered in the same sequence 115, 116, 117, 118, 119, 120, 121 and 122.

The upper two port spaces 115 and 116 are connected to the pressure feed line 208 and passage 81' of FIG. 14 to deliver fluid pressure to the servo cylinder for the piston operating reverse band 51 of FIG. 1, with an actuator structure equivalent to that of FIG. 4, operated by a counterpart of piston 70.

The third port 117 from the top of FIG. 11 is conneced to pressure feed line 250 of FIG. 14 receiving line pressure thru the main line regulator valve space 155 and line 250 connected to the pressure delivery sides of the pumps 300, 301 of FIG. 14.

The fourth port 118 is cross-connected by passage 123 in the body 200 with the seventh port 122 for reasons to be explained further below.

The fifth port 119 is the feed port for the actuation of band 45 of FIGS. 1 and 4 and connects to the passage 81 of FIG. 4 for that purpose, thru feed line 261. The line 261 is connected laterally to by-pass valve 260 of FIG. 13.

The sixth port 120, is connected to exhaust or to the spent-pressure passages leading to the sump 314.

The seventh port 121, is connected to passage 259 leading to the passages 218, 219 and 214 to the cylinder 217 for actuating the high-range clutch piston 215 of FIG. 8; and is connected by passage 166 to the chamber 165 at the bottom of the regulator valve bore 153 of FIG. 15, to act on the lower face of the boss i, under certain control circumstances.

The space 124 at the base of the distributor shifter valve 110 is open to exhaust passage 126. When the boss a of valve 110 is below the ports 115 and 116, these ports may drain upwardly past the narrow neck of the valve stem, into space 127.

The ratio-determining positions for valve 110 are marked on the drawing of FIG. 14, in order from the top "R," "H," "L," and "N," representing reverse, high range, low range and neutral, respectively.

As shown in FIGS. 11 and 14 the feed port 117 is open above boss b to deliver reverse reaction pressure at port 116 to clamp the band 51 of FIG. 1 on drum 15, while the ports 119 and 120 are sealed from exhaust.

In this reverse position "A," the low-range feed port 119 is open to the port 118 cross-connected with port 122, and the high-range port 121 is open to exhaust port 120. Since boss d is above the port 122 the cross-connection passage 123 and port 118 are open to exhaust at 126.

In the next "H" position the boss b is stationed between ports 118 and 119, so that line pressure in port 117 may pass to port 118, thru passage 123 to ports 122 and 121 for delivery to the high-range clutch feed passages 259 and 218, and boss d seals port 122 from exhaust.

Reverse port 115 at this time is opened to exhaust at 127 and low-range port 119 is exposed to exhaust port 120 between bosses b and c.

The next station downward is at point "L" of the sequence marked in FIG. 14, in which the upper edge of boss a is at the lower edge of reverse feed port 116; the lower edge of boss b is at the upper edge of line-connected port 117; boss b blocks release from low range port 119 to exhaust port 120, and bosses c and d prevent exhaust from the cross-connected ports 118 and 122. Feed is therefore from the pump line port 117 to low-range port 119 for actuation of low gear band 45 of FIGS. 1 and 4.

The last end-station downward is "N," and registers the lower edge of boss a with the upper edge of port 118; places boss b between exhaust port 120 and high range port 121; places boss c between cross-connected port 122 and space 124, and leaves boss d out of the way in space 124. In this circumstance the main feed port 117 is sealed by boss a and all of the feed ports 115, 116, 119 and 121 are open to exhaust.

The valve 110 may be freely moved among the four positions, and in each position for delivering servo actuation pressure to the various cylinders prevents any "wrong motion" delivery by the peculiar port and boss arrangement, believed to possess points of novelty in this art.

It is not deemed necessary to show the external mechanism motion for operating valve 110 beyond arm 112' and roller 141 since poppeting actions for valve-stationing and port registry are old in the art. The roller 141 for example may be traversed over a poppeted sector, the inter-poppet spaces being located angularly to correspond to equivalent angles for arm 111 as determining the stop stations marked in FIG. 14.

Persons skilled in the art may adopt this teaching as desired or needed, without exercise of invention, and obtain the useful result of the present device.

It is proper to review FIG. 14 in connection with the by-pass valve 260 shown in FIGS. 13 and 14 located in the pressure feed line 261, between the distributor valve 110 and the cylinder 68 of the low range drive actuator piston 70 for brake 45 (FIG. 4).

Engine vacuum derived in passage 262 from the engine intake manifold (not shown) is admitted to space 263 so as to vary the suction pull on diaphragm 264 acting against spring 265. The valve plug 260 seats at 266 against the pressure of line 261 tending to lift the plug 260 from the seat 266 and by-pass fluid into space 267 connected to the spent pressure line 268, which line pressure meets the resistance of calibrated spring 265.

The diaphragm 264 is equipped with abutment pin 269 which may strike adjustable stop pin 270 at a given valve opening spacing.

When pressure is admitted by valve 260 to line 268, the existence of a high degree of vacuum tends to draw the diaphragm to the right in FIG. 13 permitting the plug 260 to move unrestricted to the right for full port opening at 266. If the degree of engine vacuum is low as when the engine may be under heavy load, the force of spring 265 tends to limit the opening between plug 260 and seat 266, so that the amount of fluid relieved is less and the rise of low range actuating pressure may occur more rapidly.

The force of spring 265 is chosen to hold the valve closed normally against the pressure of passage 261.

This action is conditioned by the accelerator lever motion and setting. If the driver's lever setting, for example lever 375 of FIG. 20 is diminished toward idling, the manifold vacuum force may increase, causing the plug 260 to bleed off line pressure to a predetermined low value, whereas if the lever is advanced toward a higher engine power setting, the vacuum force drops in value, and the spring 265 loads plug 260 on the seat 266, to close off the by-pass line 268 thereby causing the line pressure for establishing the low range actuating pressure to remain high, thus providing high reaction torque capacity.

The initial low pressure phase results in fast low-range actuation under downshift from relatively low reaction torque capacity for brake 45, whereas the high pressure phase produces a higher torque capacity build-up more quickly.

The degree of low-range actuation is therefore commensurate with engine throttle position, and the invention herein in this particular is believed to represent novelty over prior art disclosures in which variations in the degree of vacuum are utilized in devices which modify automatic ratio changing controls, and in which the force available for clutching is so varied.

The mechanism of FIG. 13 may be built into a common control housing such as valve body 200, as numbered herein, or placed elsewhere for the convenience of the operator, as laid out by the designer.

FIGURE 14 is given to instruct the reader on the coordination of the many functions and operations involved in the control, actuation, working fluid supply, lubrication and cooling of the drive mechanism.

The pressure supply sources are located at the lower right of the figure, the main line regulation and servo pressure delivery controls at upper center; the steering controls of FIG. 10 upper right, the converter supply and regulation at the left with the cooling system for the converter, and the cooling for the friction brake members, at the right center. The FIG. 11 distributor valve appears upper center in FIG. 14 and the low-range shift pressure control valve 260 of FIG. 13 adjacent, at the right. The main line regulator valve 150 of FIG. 14 appears in detail in FIG. 15 and the special control valve 220 for the straight steering clutch C of FIGS. 1 and 7 is shown in FIG. 16, the control feed line for valve 220 being shown at 225.

The preceding text has described the construction and operation of the shifter valve 110, the special low-range shift control valve 260, the steering brake valves 170 and 171, and in connection with FIGS. 2, 5 and 7 has stated the operation of a portion of the brake cooling system.

In FIG. 14 a plural-pump system supplies four distinct operative groups; (1) the servo force for ratio range shift and for the steering, (2) maintenance of the working fluid of the torque converter under positive pressure, (3) cooling supply for the system fluid, particularly the converter, the sprocket drive members and steering brakes, and (4) lubrication of all wear surfaces of the entire drive assembly.

Oil is drawn from the sump 314 thru the screens shown at the bottom of FIG. 14 and is routed thru a special filter 311 locatable in the valve body 200, which body may include the pressure regulator valve 150 to hold the main line pressure at a high level when gear drive is in the low-and-reverse ranges and at a lower pressure level when drive is in the high range.

A second regulator valve 230 in the relief passages from the main line regulator valve 150 serves to adjust the pressure in the converter working space feed and cooler lines to a lower than line level. The relief from valve 150 is the point of take-off for the general lubrication oil, and this section of the system is held at a predetermined low pressure below that of the preceding section by valve 230.

The drain from the converter working space is passed thru two coolers K and K'. Passage 257 from pump 302 is provided leading to cooling jets 310, 312 for the vehicle brakes 46 and 50, for constant cooling, while passages 91 and 91' provide additional cooling during the braking interval as described for the FIG. 5 showing.

Pump 300 driven from shaft 303 geared to shaft 1 of FIG. 1, delivers pressure whenever the engine is operating. It feeds in two paths, the first by line 306 to check valve 305 and to main pressure line 250, the second by line 307 to filter 311 and to line 250. If the filler 311 becomes blocked, check valve 305 loaded for a given poundage by-passes the filter 311. Safety valve 308 is connected to relieve excess pressure in line 307 to lubrication line 253 and lubrication feed passage 258.

Pump 301 is driven from gear 299 of FIG. 8 proportionally to output speed, and fulfills two needs, one to furnish vehicle brake cooling pressure and the other to increase or augment the pressure of line of pump 300. The latter result obtains from connecting delivery line 90 thru check valve 312' to line 307, with the valve calibrated to provide augmented feed at a given line pressure. Line 90 feeds as shown in FIG. 5 thru valve 92 to cooler jet 309, and thru a second valve 92' to a similar jet for the other vehicle brake 50.

Pump 302 is also driven from output-speed 299 of FIG. 8 and supplies a constant cooling feed to the jets 310, 312 and similar jets for brake 50 of FIG. 1.

It should be understood that the cooling jet method described here in connection with the vehicle band brakes 46 and 50 is equally applicable to the modification construction of FIG. 8 in which brake discs 102, 103 replace the band method. For this purpose the section 104 of FIG. 8 attached to the casing 100 may be drilled out for coolant feed passages similar to 91 and 257 of FIG. 5, leading to the spline sections for plates 102 from whence the cooling fluid may flow axially along the splines and radially outward across the friction faces of the plates 102, 103 to return the sump 314 of FIG. 14, as at 317' of FIG. 8.

In the controls of FIG. 14 the valve body 200 may contain one transmission ratio shifter valve 110 and the two steering brake control valves 170 and 171, operated thru external levers 188, 112' shown in FIGS. 9 and 12, these valves directing the flow of oil under pressure to the servo cylinders for the clutches and brakes. The body 200 may also contain the main regulator valve 150, the converter regulator valve 230 as well as the other members of the valve control system, appropriately connected. The steering brake control valves 170 and 171 may be controlled by cross lever 184 inside the valve body 200, which pulls one valve plunger into closed position while depressing the other plunger for the other valve, as described preceding.

It is not deemed vital to show the complete body 200, since no particular ingenuity is required to group these elements with connected passages and portings for the carrying out of the present instructions.

The "converter regulator" of FIG. 14 consists of tapered valve 230 seated at 231 in a portion of casing 200 and normally isolates spaces 232 and 232', the space 232 being continuous with the bore 234. The lower space 232' is connected by angular passage 162' with passage 162 connected to port 161 of valve 150, and also to passage 235 jointed to the two outflow leads 236 and 236' of the coolers K and K'. The upper space 232 and bore 234 are connected by passage 237' with the lubrication channel 252, with the line 253 leading from the interior of the safety valve 308, with the connection 268 from port 266 of valve 260, of FIG. 13 and with lubrication passages 330, 334 and 334' leading to the bevel and transfer gear casings.

The stem 230' of the valve 230 is fitted with a guide piston 229 in a separate bore portion, and spring 238 loads the tapered portion on the seat 231 at a predetermined force value. Diagonal port 239 drilled in the tapered head of valve 230 connects space 232' with space 232 even when the valve 230 is firmly seated, so as to deliver lubrication oil to the connected system.

The space above the piston guide 229 is connected externally at passage 233 for drain to the spent pressure passages 259.

The working space of the converter W as shown in FIG. 14, is fed by passage 325, the oil being delivered by passages such as indicated in FIG. 17, adjacent the low pressure zone of the converter, and the circulatory flow from the converter passes at 254 to cooler intakes 254', from a point adjacent the high pressure zone, as shown in FIG. 8.

This circulation system tends to isolate the body of oil used in the working space from the body used for lubrication, until the working space body has been thoroughly cooled.

It should be noted that cooled oil in cooler outlets 236, 236' may recirculate thru space 232' of valve 230, angular passage 162' and line 252, by thermal and by converter pressure induced circulation forces.

The corresponding view in FIG. 17 of the converter working space shows line 325 feeding to the low pressure zone and line 254 leading outward from the high pressure zone.

The foregoing description has presented the separate operations of the various units, but it appears desirable to state briefly the circulatory action within the system especially pertaining to maintenance of proper lubrication. It must be appreciated that in drive mechanism capable of moving large vehicles of weights approaching 100 tons, it is of paramount importance to control every portion of the drive in which heat is generated, not only for the fluid torque converter W described above, but also the other drive elements and units. The cooling lubrication flow for the steering brakes and vehicle brakes is referred to above and in more detail following.

Pressure passages 251, 162, 237' and 252 are involved in the controlled lubrication feed, although the series of exhaust passages numbered 314 to correspond to the sump may be tapped, if required to assure additional oiling of running parts. Line 258 is actually the central shaft passage of shaft 40 of FIGS. 1, 2 and 8 and feeds lubricant as described above in connection with FIG. 8. Line 237' is connected to passage 330 of FIG. 1 to furnish lubricant to the differential gear of FIG. 2, and is also connected at 330' to passage 334' for feeding lubricant to the transfer gearing of the vehicle, not shown in the drawings. Spent pressure from the transfer gear casing is, of course, drained back to sump 314 of FIG. 14. The valve 257' upper-left in FIG. 14 is set at a given low poundage to sustain the lubrication pressure in the system between the valve and the lubrication head pressure furnished in line 251.

The brake and clutch cooling system described in connection with FIGS. 2, 5, 7, 8 and 14 is believed to present features of novelty. In large heavy vehicles of the types for which the present drive assembly is devised, it is found useful to provide velocity flow cooling by lubricant on a basis of constant flow plus intermittent or auxiliary augmented flow during the actual work intervals. In this way, a fairly stable temperature level is maintained for the friction elements required to absorb the braking energy, and when the bands or discs are actuated either for steering or for vehicle braking the cooling system provided is equipped with controls which introduce the supplementary jet flow over the engaging friction faces.

For this purpose each of the housings of the brakes 46 and 50 for vehicle braking, are equipped with nozzles or jets such as shown in FIG. 5 at 309 and 310, one for constant flow cooling, and the other for supplementary cooling under friction drag load. In the case of the alternate showing of the disc brake 102, 103 of FIG. 8, a pressure feed lead 91 in section 104' is shown to deliver a velocity stream of lubricating oil as a coolant to the splined portion of the drum of 28, the lead 91 being connected as shown in FIG. 14. A similar lead 91' would, of course, supply similar coolant passage to the disc brake on the opposite side of the vehicle.

It is of even greater importance to feed a stream of coolant oil to the steering brakes 61, 62 and 61', 62' of FIGS. 1 and 2, since these will be operating under variable torque capacity conditions for a considerable percentage of the operating time.

For this purpose, jet pairs 317 and 318, 319 and 321 are shown in FIG. 2, and are connected to passages for both constant flow cooling and augmented cooling, the pair of jets 317 and 319 one for each steering brake receiving flow from passage 320 connected to passage 252 of FIG. 14, and the pair of jets 318 and 321' receiving flow from passages 321 and 322 of FIG. 14, which flow is directed from valves 170, 171 to passages 172 and 173 of FIGS. 10 and 14.

It seems clear that the brake and clutch cooling system described, provides at all times a normal cooling flow for obtaining a temperature level condition as well as a controlled augmented flow available directly with energy absorption demand. A further method is described in connection with FIG. 17.

FIG. 15 is a detailed view of the main line pressure regulator valve 150 shown in the schematic view of FIG. 14. This valve is calibrated in its action by spring 151 adjustable by screw plug 152 threaded in bore 153 of the valve body 200.

Valve 150 has three bosses labeled g, h, and i from top to bottom. The valve is exposed to the main line pump pressure in port 155.

The valve neck between bosses g and h is cross-drilled at 156, and centrally drilled at 157 from the lower end for connecting to passage 156.

The lower end of the valve is cross-drilled at 158 to intersect passage 157, and is seal plugged from this intersection to the lower end. The pump pressure in line 250 and in port 155 acting thru passages 156, 157 and 158 differentially on the lower face of boss h tends to lift the valve 150 against spring 151 within the limits set by stop pin 160. Toward the top of the stroke the boss g uncovers port 161 and releases sufficient pressure to regulate the net line pressure delivered by the pumps 300, 301 of FIG. 14, in the passages connected to the port 155, the port 161 connecting by passage 162 to the return lines of the pump system, or to the lower pressure lines.

At the bottom of its stroke the port 167 may be uncovered to deliver pump line pressure to passage 164 leading to the lubrication system and the spent-pressure lines, when abutment screw 165' is lowered.

Since the boss i is of smaller diameter than boss h, the pressure admitted to passage 158 tends to provide a net lift against spring 151 which is adjusted for providing the higher pressure required for low range operation.

The space 165 below boss i is connected by passage 166 to the feed passages 259 and 218 of the high range clutch 30, 31 shown in FIG. 8. When the high range clutch is actuated by the distribution action of valve 110 of FIG. 11 the pressure admitted to space 165 below boss i is added to that derived differentially between bosses h and i, having the net effect of overcoming the force of spring 151, and raising the valve 150 to bleed off line pressure from port 155 to port 161, so that the available line pressure in the servo system beyond port 155 and involving the actuation pressure distributed by valve 110 of FIG. 11 is less when the high range clutch is driving. The preceding discussion of FIG. 11 will make this action clear. The upper portion of the bore 153 is open to exhaust at 185.

Mid-way of the boss i is exhaust port 167 which is exposed to the pressure of space 165 derived from the high-range clutch actuator line 166, when the high-range pressure is sufficiently high, along with the differential lifting pressure between bosses h and i, to provide maximum lift against spring 151. This pressure is exhausted from space 165 thru port 167 to the lubrication and spent-pressure passages shown in FIGURES 14 and 15.

Regulator valve 150 of FIG. 15, subject to the main line pump pressure, is adapted to hold the servo line pressure at a high value for drive in low and reverse ranges, and to a lower value for the high range; for example, 200 p.s.i., and 100 p.s.i., respectively, in the operation described above.

The control of the pressure for actuation of the straight drive clutch C of FIGS. 1 or 7 is devised to cause the piston 63 in cylinder 64 to press the plates 54, 56 together at all times when the vehicle is being steered on the straight-away, and to vent the cylinder 64 when any steering action is required.

For this purpose in FIG. 16 valve body 200 is bored at 219 for valve 220 pressed upward by spring 221 against abutment cap 222 to connect ports 223 and 224 between the bosses of the valve to deliver pressure from passage 225 connected to the main line pressure passage 250 of FIG. 14 to passage 65 connected to cylinder 64 of FIGS. 1 and 7. This arrangement normally loads the clutch plates 54, 56 whenever any servo pressure is available.

The valve 220 is caused to shift downward to venting position by control pressure admitted to ports 226 or 227 from passages 236 or 237. This action shuts off feed from port 223 and connects port 224 to exhaust port 228 which delivers the spent-pressure to the lubrication passages of the system, such as passage 258 of FIG. 14.

The body 200 is threaded for cap 222 which is adjustable to limit the travel of valve 220 upward. Plug 230 fitted in the bore 219 above the valve is dimensioned linearly to provide abutment spacing to register the ports 223, 224 as shown, for normal clutch actuation.

When pressure is admitted to line 236 and port 226, the plug 230 pushes valve 220 into the clutch disengagement position, while venting of line 236 permits spring 221 to restore clutch drive. When pressure is admitted to line 237, it is exerted between the plug 230 and the top of valve 220, forcing plug 230 upward, and forcing the valve 220 down. Venting of line 237 restores the condition shown in FIG. 16, for clutch engagement.

Since the steering brake valves 170, 171 of FIG. 10 send line pressure to lines 172 or 173 depending upon the steering direction desired, it is obvious that any steering effect introduced by lever 184, of FIG. 10 will cause valve 220 to shift to vent the cylinder 64 of clutch C of FIGS. 1 or 7.

While FIG. 16 definitely shows the valve 220 subject to the presence or absence of steering pressure it is within the purview of the invention to press the valve to relief position by a control rod inserted in cap 222, as suggested by the dashed lines, or by auxiliary pressure feed to one or both of lines 236 or 237, if such overcontrol be required in order to obtain a desired cross-feed steering effect by braking application of brakes 46 or 50 of FIG. 1.

In FIG. 17, the system shown is quite similar to that of FIG. 14.

Pump 300 provides pressure for main pressure line 250, augmented by pump 301 which also assists in the steering brake cooling as described in connection with FIG. 5, and pump 302 provides constant jet cooling flow for the vehicle brakes 46 and 50. The valving 92, 92' provides augmented cooling flow for the braking intervals.

The main pressure line 250 supplies servo actuation pressure for the plural distributor valve system, for a set of ratio servo pilot valves MV, magnetically operated by an electrical energizing system, for two similarly operated steering valves 170a and 171a, and is connected thru a main line regulator valve 150a similar to valve 150 of FIGS. 14 and 15, for equivalent uses.

The lubrication system is closely similar to that described with respect to FIG. 14, and the converter working space flow and cooling system is in general like that described preceding.

The control diagram of FIG. 17 is similar to that of FIG. 14 except that the ratio control valve arrangement utilizes plural and separate valves, whereas FIG. 14 shows a single ratio distributor valve.

It is apparent that it would be highly desirable to arrange the plural valve group so that only single actuation for ratio could ever occur, hence the fluid pressure system is cross-connected thru pressure passages which deliver a component of servo pressure to latch out or positively hold out of action the other two ratio valves, when a selected one is energised.

Since the plural ratio-determining valves Vr, Vl and Vh are provided, with plural magnet valves energised by circuits for them, which are controlled from a common switch box—the fluid cross-connection method prevents simultaneous actuation of any two, and permits that of only one servo piston, as will be understood further in detail.

Since the three valves Vr, Vl and Vh are identical it is necessary to describe the operation of one, as is done below with respect to valve Vl shown in detail in FIG. 18.

The steering brake controls shown in FIG. 17 operate essentially the same as the construction shown in FIGS. 10 and 14. The equivalent parts bear the same numbers in both figures. The magnet valve operation as described later in detail in connection with FIG. 19 will be described as effecting the operation of steering valve 171a of FIG. 17, the corresponding control for valve 170a being the same. In the unloaded position of the magnet valve armature 245, such as shown in detail in FIG. 19, the ball valve 240 is seated and no pilot valve pressure is delivered to passage 242, whence the steering brake A is not actuated. Valve 171a is held down by spring 203, inlet pressure port 201 is blocked by boss e and the brake servo feed port 174 is connected to exhaust port 198. The lower end of valve 171a has additional boss n which is lifted by pressure in space 196 from control passage 249. Energisation of magnet valve armature 245 pushes ball valve 240 off its seat and admits pressure from the main line 250 to passage 249 to raise valve 171a. This exposes input pressure port 201 to steering brake feed port 174 and closes exhaust port 198, to deliver actuation pressure to passage 172 and cylinder 58 of steering brake A of FIGS. 1 and 2.

Boss f in rising, exposes port 327 connected to low pressure line 326, and flow to port 328 is permitted, feeding passage 322 leading to jets 318 and 321 for cooling the plates 61 and 62 of FIG. 2.

De-energisation of armature rod 245 permits ball valve 240 to close, resulting in a drop of pressure in line 249 and space 196, whereupon spring 203 shifts the valve 171a down to the original position shown in FIG. 17.

The electrical circuit for the coil 241 of FIG. 19 may be so manipulated by a control switch that a degree of loading may be averaged on plates 61, 62 of steering brake A, by momentary opening and closing of the magnet control circuit, such that a fairly smooth steering action is obtainable although for certain specified constructions, the arrangement of FIGS. 9, 10 and 14 is preferred.

The main line regulator valve 150a of FIG. 17 is differently made from valve 150 of FIGS. 14 and 15. The valve 150a has only two bosses p and q and the lower boss q is hollow, and connected to the space between bosses p and q by a passage 157a shown in dashed line. A separate plug 150b located in the bottom of bore 153 is hollowed out and conforms to the dimensions of boss q.

The porting sequence in casing 200 from the top downward is 165, 161, 155, 169, and 168. The third port 161 corresponds to that of FIG. 15, and is the relief port connected to the converter regulator chamber 232, and to lower pressure line 235. The fourth port 155 corresponds to that of FIG. 15, and is connected to the pressure of line 250. The lifting pressure differential to raise the valve 150a against the spring 151 is obtained by the feed thru passage 157a leading to the hollow interior of boss q. The space 168 below plug 150b contains the shank of adjustment stud 165', and is connected to exhaust port 167 by passage 167'. Passage 185 drains fluid from the space above valve 150a and exhaust port 169 connects thru line 251 to the lubrication passage 258.

A separate plug 149 occupies the separate bore space 165 at the top and is exposed to the pressure of line 166 to depress stem t of valve 150a.

Normal line pressure regulation is obtained in the same manner as in the FIG. 14 construction. Plug 149 in the separate bore recess 165 at the top may engage stem t of valve 150a, when pressure is supplied in line 166, which arrangement enables the valve 150a to operate within two pressure ranges, high and low, so that when the high range clutch 30, 31, of FIG. 8 is actuated, the pressure in space 165 above plug 149 is removed, so that the regulation effect of valve 150a on line 250 is due only to the force of spring 151 and the pressure area inside boss q. However, when the pressure in line 166 forces plug 149 downward, the pressure rise in 250 is required to be higher, to overcome both the spring 151 and the load of plug 149, for a desired relief effect at port 161, hence for the low range drives, the normal pressure above plug causes regulator valve 150a to maintain a high pressure in the main line 250, whereas in high range, the pressure level in 250 is maintained at a lower level.

This net effect is substantially the same as that of valve 150 of FIG. 15 but is obtained thru different feature combinations.

Recalling that the regulator valve 150 of FIG. 14 was automatically overcontrolled so as to provide a lower pressure line during actuation of high range clutch 30, 31, by pressure delivered to space 165 thru line 166 from the connection with clutch feed passages 259, 218 from port 121; a somewhat similar arrangement is provided for supplying pressure to line 166 of FIG. 17.

The high range distributor valve Vh furnishes clutch actuator pressure from port 121 to passage 259, and to connected passages 218.

A separate pressure booster valve 340 is fitted in a bore 341 of valve body 200, having a stem u and two bosses v and w.

The bore 341 is ported in succession from the top at 342, 343, 344, 345 and 346.

Ports 342 and 343 connect to exhaust at 314. Port 344 is open to control line 166, port 345 is joined to the regulated pressure line 235 and port 346 is connected to input control pressure line 259'.

Spring 347 presses the valve 340 downward to act against the pressure in port 346 from line 259', and therefore the normal condition would be for ports 344 and 345 to connect the space between the bosses v and w for delivering pressure from line 235 to line 166 to press the plug 149 of the main line regulator valve 150a against the stem t. Under this operating condition pump pressure tending to lift valve 150a must reach a higher level for exposing port 161 and for delivering pressure to the regulated line 235, as compared with the condition when the pressure on plug 149 is removed.

Therefore when valve 340 is in the condition shown in FIG. 17, the high range clutch 30, 31 is not actuated, low range drive is either potentially or actually in effect; and the feed-back regulation obtained by the force of plug 149 on stem t of valve 150a establishes a high pressure level, for example, 200 p.s.i., for drive actuation in low range.

When distributor valve Vh is raised to deliver clutch actuation pressure to line 218, as determined by energisation of the associated magnet valve MV, the pressure in line 259' is exerted in port 346 below valve 340 to raise it against spring 347, whereupon boss w blocks the port 345 connected to the line 235, and port 344 of line 166 is connected to exhaust port 343.

In this way, automatic change of main line pressure level is obtained inversely to change of drive between low and high range.

Each time high range drive is established by operation of valve Vh, the net main line pressure is dropped to its lower operating level, say to 100 p.s.i., and remains there until valve Vh is released by shift of its magnet valve pilot to release the torque of clutch 30, 31 whereupon the full high pressure level is established by valve 150a for the low range operations, which, of course, include drive in reverse.

The converter regulator valve 230 of FIG. 17 operates somewhat differently from that of FIG. 14 in that the cooler circuit for the converter is joined to the output relief line 162 of the regulator valve 150a thru passage 235, with flow restrained by restriction orifice 235' preceding the point of connection to the circulatory cooler flow.

Attention is further directed to the method shown for cooling the steering brakes. In FIG. 14 the fluid feed lines for cooling lubrication of the steering brakes are taken at 321 and 322, in FIG. 17 each of the valves 170a and 171a controlling differential steering, are ported at 328 and 329a for delivery to lines 322 and 321. The constant feed flow to the cooling jets 322 and 321 is provided by any suitable connection, not shown, from lubricating passage 320 with pressure supplied from line 252, which flow is augmented by pressure from lines 326, thru ports 327 and 329 to ports 328 and 329a shown in the upper portion of FIG. 17 and thru the jets 318 and 321 of FIG. 2.

The valve of FIG. 18 is a detailed showing of one of the ratio distributor valves Vr, Vl or Vh of FIG. 17, and its operation description will suffice for all three of these valves.

The valve body 200 is bored at 272 for valve 283 and is sealed at the top by screw cap 271 retaining spring 273 and having attached stop 274.

The section 200 is ported successively downward at 275, 276, 277, 278, 279, 280 and 291. Ports 277 and 275 are cross-connected by passage 282 and 275 is open to passage 285. Ports 276 and 279 are cross-connected by passage 288. Input port 278 is open to line 281, port 280 to line 289 and the space 291 below the valve is jointed to passage 242 which is shown in FIG. 19.

The valve 283 of FIG. 18 is taken as valve V1 of FIG. 17. It has four bosses j, k, l and m in order from the top. It is centrally drilled at 284 to intersect cross-drilled passage 290 between bosses l and m. Spring 273 normally holds the valve downward in the position shown, in which pump line pressure in passage 281 and port 278 is blocked by boss k. The exhaust passage 289 is connected thru ports 280, 279 to passage 288 open to the cylinder 68 of brake 45 of FIG. 4, thus passage 261.

In the lowermost valve position, port 276 is also connected to exhaust by passage 288.

Rise of the valve 283 under pressure applied to space 291 from pilot valve feed passage 242 as directed by the magnet valve 240 of FIG. 19, causes exhaust port 280 to be sealed by loss l, and boss k exposes main line pressure port 278 to port 279, whence the line pressure flows via 288, 261, to cylinder 68 of FIG. 4, actuating band 45 for low range drive. In this position main line pressure in passage 288 passes thru the space between bosses j and k to port 277, to passage 282, around port 275 to line 285, which by reference to FIG. 17 is cross-connected to passages and ports similar to passage 282 and port 275.

When line pressure is in port 275 above valve 283, it may not pass thru central passage 284 to drilling 290 between the bosses l and m, since the boss j seals any entry, while drilling 290 being open thru 280 to exhaust line 289, drains passage 284 and the space above the valve in the bore 272.

Reciprocation of valve 283 as controlled by pressure in space 291 or spring 273, therefore causes actuation or release of band 45 of FIGS. 1 and 4; while similar operation of valve Vr, it is understood, will cause equivalent actuation of reverse drive band 51 of FIG. 1.

The main pressure line 250 is equally connected to the reverse, low and high range ratio shifter valves Vr, Vl, and Vh.

In FIG. 19 is shown the detail of one of the solenoid-operated valves 240. When current is supplied to the coil 241, main line pressure is admitted by the valve 240 to passage 242 connected to the corresponding pilot cylinders 291 and bosses m or n to operate one of the valves of FIG. 17.

As noted preceding, when the low and reverse range distributor valves Vl and Vr are being actuated, a portion of the feed to the converter working space is diverted from line 235 to exert a force on regulator valve 150a to assist the spring 151 normally calibrated for providing the low level of pressure in the main line pressure spaces, so that the high pressure level is maintained for drive in low range.

With the high range distributor valve setting, the spring-assisting pressure is cut off, leaving the main pressure line 162 at the lower pressure.

Both of FIGS. 14 and 17 show the three gear pumps 300, 301 and 302, the pump 300 being driven from the input shaft 1, and the pumps 301 and 302 being driven from the output carrier 35, from shaft 303 and gear 304 respectively.

The output-driven pump 301 is connected to the augmenting cooling-oil feed line 90 for the brakes 46 and 50 of the sprockets 21 and 37, and the second output-driven pump 302 furnishes a constant additional cooling-oil flow for these brakes when the servo actuators for same are not energised.

When the engine is running, the pump 300 supplies oil under pressure to the valve body elements and also thru passage 250 connected to space 155 of the regulator valve. When the vehicle is in motion, output-driven pump 301 also furnishes pressure to the main line 250 except when the vehicle brakes 46 or 50 are applied. In the case of the vehicle being towed to start the engine, output-driven pump 301 provides the supply to the main line pressure space 155. Output-driven pump 302 furnishes its whole supply to the sprocket shaft brakes 46 and 50 for constant cooling when the vehicle is in forward motion. As noted above, one-way clutch F transmits overtaking torque from shaft 5 to shaft 7 during a towing start, to by-pass the converter W.

FIGS. 14 and 17 except for the certain differences noted, provide the general pressure flow controls for the drive structures of FIGS. 1 to 8.

FIG. 19 shows a form of distribution control valve for controlling the delivery of actuation pressure to one of the spaces 291 or 196, 197 for the bosses m or n which actuate the various clutches or brakes of the various operating elements of the drive, with particular reference to FIG. 14.

The principle here involved is that of using an electrically energised pilot valve to control the action of the distribution or delivery valves of the assembly.

The complete system using this form of pilot or monitor valve is given in FIG. 14, as controlled by the electrical diagram of FIG. 20.

The FIG. 19 construction consists of a valve body 200a bored at 243 for ported insert 244, and equipped with solenoid coil 241 at the open end of the bore. The solenoid armature 245 is a rod-shaped piece drilled centrally and cross-drilled at 246, the lower end fitting against ball valve 240. The insert 244 is recessed at the bottom for ball-seat piece 248 which contains the valve 240 and valve spring 247. The insert 244 is cut away circumferentially along its external mid-section to register with output delivery passage 242, and is drilled out centrally above seat piece 248 to accommodate the lower end of the armature rod 245 and laterally drilled at 244' to connect the space above valve 240 to the passage 242. Pressure from the main delivery line is admitted by passage 250 to the interior of the seat piece 248. The cross-drilled portion 246 of armature rod 245 is open to exhaust passages, not shown in FIG. 19.

Normal line pressure of passage 250 holds valve 240 on the seat in 248, aided by spring 247, the passage 249 being exposed to exhaust by passages 244' and 246. Energisation of coil 241 presses the rod 245 down to unseat ball valve 240 and admit line pressure to the control line 249. De-energisation of coil 241 permits line pressure inside piece 248 to snap the ball valve 240 on its seat, the differential pressure effect on the tapered shank end of the rod 245 tending to lift same and expose the central passage connected to passages 246, whereupon the line 249 is drained. The closing snap action of ball valve 240 tends to apply a lifting momentum to rod 245 while the decay of flux in coil 242 may also accentuate this action, hence, although the pressure differential area of the exposed lower end of rod 245 is small to the eye, this device performs constantly and effectively as described, with no delay in desired pressure release action.

No spring is needed to hold the spherical seat of rod 245 against ball 240, nor is any required to lift rod 245 away from the ball valve, as is common in other forms of magnet valves.

The coil wire leads 361, etc., may be dealt with on a single lead and grounded return basis, or on a double lead basis.

In FIG. 20 a schematic diagram is given, showing the essentials of an electrical system for controlling the solenoid valves MV of FIG. 17. The right and left steering solenoids are shown connected by leads 351 and 352 to a steering switch box, at contacts 353 and 354 alternately contacted by switch arm 355 connected to the battery lead 356. The switch arm 355 is moved by steering shaft 357 from wheel 358. The solenoid valves MV for determining low or high range, or reverse drive are connected by leads 361, 362, and 363 to contacts 364, 365, and 366 of the switch sector plate 367, for selective contact by selector arm 368 connected by lead 369 to the battery lead 356. The arm 368 is shifted by pivoted rod 370 from crank arm 371 of shaft 372 mounted in bracket 400 and rotated by selector handle 360. The track of sector plate 367 is raised between "H" and "R" to provide a driver warning against inadvertent reverse shift.

A wide range of arrangements utilizing the pattern of control of FIG. 17 is open to the designer, and FIG. 20 is provided primarily for showing a fully operative one for the FIG. 17 system, which is obviously adapted to whatever switch-point sequence and mechanical linkage is needed to control the installation.

While it is desirable in the particular installation used here as an example, to group the entire fluid pressure system of either of FIGS. 14 or 17 in one housing or casing, to which the valve body 200 containing all of the various valves may be applied, it is equally useful in other forms of installations to segregate certain of the units in separate housings or containers, as the space requires for load distribution and accessibility.

The structures of the FIG. 20 diagram may be so separately distributed. In the supplementary steering control for the electrical steering clutches 67, 67' of FIG. 7 alluded to above, the steering switch box 373 and the right-and-left magnet valves MV would be replaced by the elements of the diagram of FIG. 3 of my application for Letters Patent, Patent No. 2,585,790 referred to above.

The bracket 400 in FIG. 20 also supports the throttle-operating lever 375 attached to rod 376 pivoted to lever 377 mounted on bracket 401, the lever 377 operating rod 378 for opening and closing the engine throttle.

Pedals 380 and 381 are shown to suggest means for operator control of individual left-and-right vehicle braking devices such as shown in FIG. 1, 5 and 8, and may be connected to elements such as 88 of FIGS. 6 or 98 of FIG. 8 by appropriate rods, links and levers.

FIG. 21 is given to show a form of pump which may be substituted for the output driven pumps 301 and 302 of FIGS. 14 and 17. Since the form of pump is believed well-known, as shown in British Letters Patent 158,400 to Wilson, the drawing of FIG. 21 is schematic.

The pump casing 390 contains the meshing pump gears 382 and 383, is equipped with four check valves 384, 385, 386 and 387; with passages 388 and 389 connected to sump 314 for suction; it contains space 391 at the left, corresponding space 392 at the right and the passages 393 and 394 connected to the jet cooling delivery line 257, as if replacing pump 302.

Under forward rotation as shown by the circumferential arrows, the passage flow of fluid is shown by the solid line arrows. Under reverse rotation indicated by dash-line circumferential arrows, the flow is denoted by dashed lines. This form of pump therefore supplies its pressure for either hand or drive rotation. Similar substitution may be made for pump 301, or the output lines instead of delivering only to line 257, may be branched to deliver pressure to both lines 257 and 90, as well as to check valve 312 of FIG. 14, as a single pump replacing two, assuming its gallons-per-minute capacity is adequate. The check-valve springs 396, 397, 398 and 399 are gauged for the design area pressures and capacity requirements, the seats for the check valves being formed in the casing 390, as shown.

*General operation*

In the foregoing specification description, the particular operation of each unit and part is described in detail, yet it is believed essential to provide further description covering the overall drive operation.

First, considering the primary control version of FIG. 14 with the associated structures of the other figures, the operator starts the engine, with the control for distributor valve 110 placed in neutral. There is no drive, but the impeller of converter W is rotating and may furnish a torque fraction to shaft 7 and connected elements. The pump 300 driven by shaft 1 delivers pressure to line 250 and valve 150 adjusts the line pressure to 200 p.s.i., while feeding the lower pressure lines 162, 325, and valve 230 further delivers pressure to lines 252, 237' and 258. If necessary, screw stud 165' may be lowered to permit exhaust port 169 to be uncovered for purposes of calibration, adjustment and checking of the various functions prior to drive usage of the vehicle. The pressure in lines 250, 255 and space 155 is also in line 225 and clutch C is normally fluid-pressure actuated. It will be noted that the lubrication system is functioning ahead of drive load application. The device of FIG. 13 is capable of pressure relief at idling throttle, or of being prevented from acting by advance of engine speed which would reduce the vacuum force on diaphragm 264 to a lesser value than that of spring 265.

Movement of valve 110 delivers servo pressure from lines 250, 255 to passages 261, 81 for applying low range brake 45 of FIG. 4, and drive begins.

With operator rocking of shaft 180 of FIGS. 9 and 10 thru mechanical connection with a steering device such as 358 of FIG. 20 would cause one of valves 170, 171 to deliver steering pressure to one of the brakes A or B of FIG. 2, the cooling jets such as 317, 318 being operative to conduct heat away from the friction absorption surfaces, coincidental with release of the clutch C thru the agency of the control of FIG. 16. If during low range drive the vehicle brakes 46 or 50 are applied thru their mechanical linkages, one of the valves 92 or 92' delivers cooling jet flow to the brake being actuated. In the case of the FIG. 8 structure, jets 317', 318' similar to 317, 318 of FIG. 2 are applied equivalent to the showing of FIG. 5. The pumps 301 and 302 have been brought into action by motion of the vehicle to supplement the pressure flow requirements as detailed above, and the pressure system of pump 300 is operating at the desired high pressure level by the described action of regulator valve 150.

The valve 110 may be moved back to the "N" position, or it may be shifted to the "R" position for delivering pressure to the operating piston for brake 45 of FIG. 1 for low range drive in reverse.

Since pumps 301 and 302 under reverse drive, if of common form as described in FIG. 14 would tend to pump backwards toward the sump 314 and starve the lines 90 and 257, the brake jet supply system fed by these lines would be inoperative, therefore in actual practice, for long-continued drive in reverse, it is apparent that these pumps should be arranged to continue delivery of pressure, regardless of the rotation direction of the output drive, therefore the pump P of FIG. 21 is shown with the understanding that it is usable as a type to replace either or both of pumps 301 and 302. Similar substitution may be made in FIG. 17, as is obvious.

Now if the operator desires a shift of valve 110 may be made from either low range position "R" or "L" to "H" for high range. While it may be thought necessary to drain the ratio servo cylinders by shifting to "N" before taking up drive in another ratio, or range, in practice, with large heavy vehicles, requiring high maneuverability, the friction deceleration effects are so pronounced that the mere idling of the throttle in ordinary drive mechanisms, causes a severe deceleration and reverse-torque shock, an undesirable result. Further, because of such sudden motion stopping effect, time is lost and also extra power is needed to overcome the inertia and to get the vehicle into motion again.

For these reasons, the controls and the fluid capacity of the various passages, supply lines and cylinders are so phased, that under ordinary operating conditions, the torque of the drive may be maintained over the ratio shift dwell intervals, aided by the drive flexibility of the torque converter W. Obviously under shift from reverse to forward or forward to reverse, the hand or rotational direction of output torque must pass thru zero, therefore, in the present control arrangement, it is advantageous to initiate the pick-up of drive in the new ratio prior to the zero torque interval although it may be thought a severe task for the mechanism to absorb slip torque in this manner. In practice, the valve 110 may be shifted freely from "R" to "H," or "L" to "H," within reasonable road speed ranges, without a need for interval-dwell in "N," and conversely. The external controls for valve 110 under shifts between "R" and "L," such as when rocking a vehicle out of bad traction areas, may be moved sufficiently rapidly across the "H" position that only a momentary surge of pressure is felt in the cylinder 217 of FIG. 8 resulting in temporary loading of plates 30, 31. This temporary loading effect is actually advantageous since it tends to bring sun gear 12, annulus gear 29 and carrier 28' to the same speed, the torque absorption then occurring leaving less to be taken on the low and reverse bands 45 and 51, therefore extending whatever torque reversal shock might exist over a broader time and friction-area base.

In shifting into high range, the valve 110 delivers main line pressure to cylinder 217 of clutch 30, 31 and in FIG. 14, this pressure serves to shift the metering control load of regulator valve 150 to a lower line pressure value, this resultant occurring in advance of the full loading of piston 215, thus avoiding slamming of plates 30, 31. At the same time the pressure, regulating plug 260 for low range drive is relieved from duty. Should the high range shift be undertaken during a time when the valves 170, 171 are delivering a steering effect, the drop in line pressure caused by valve 150 is expressed in the lines 255, 256 and feed passages 210 or 211, to proportion the existing steering effect to the ratio of primary drive, otherwise as the high range clutch 30, 31 were opened or closed, the differential steering effect of brakes A or B could be strengthened or diminished so as to cause unpleasant or dangerous yawing of the vehicle at a critical moment. This compensating characteristic and useful steadying effect is therefore of considerable importance in the overall safe and accurate handling of a large vehicle, otherwise clumsy and poorly maneuverable.

The invention herein, in actual practice has provided an exceptional factor of "nimbleness" and a surety of steering control, and these useful results are obtained in actual practice, as described above.

In the FIG. 17 version, the overall drive operation is practically the same as described above for FIG. 14, except for the differences noted preceding. The operator may start his engine with the ratio switch control 360 of FIG. 20 placed at "N," when no pressure is delivered by any of valves Vr, Vl or Vh, but the line pressure is delivered to the lubrication passages as described, the clutch C is made capable of coupling by pressure in line 225, from lines 255 and 250, and valve 340 is stationed as shown in FIG. 17 to cause regulator valve 150a to establish the higher level main line pressure in 250, with working-space circulation thru converter W. In arctic weather, the vehicle may be warmed up for as long as is necessary for stabilizing the torque speed converter response.

Shifting of ratio handle 360 of FIG. 20 from "N" to "L" energises a solenoid coil 241 of FIG. 19 to cause valve Vi to admit line pressure to passages 288, 261 for actuation of brake 45 of FIG. 4, the pressure in lines 282, 285 serving to inhibit actuation of drive by either of valves Vr and Vh until valve Vl is shifted to release position by spring 273. The same operating relationships hold for energising of the valves Vr and Vh, as ratio range-control handle 360 of FIG. 20 is moved to swing selector switch arm 368 to the marked energiser-circuit contacts 364, 365 or 366.

Under steering motion of wheel 358 applied to switch arm 355 of FIG. 20 for selective energising of the right or left steering magnet valves MV, the same drive relationships occur as under the FIG. 14 control system.

While the FIG. 13 device is not reproduced in FIG. 17, it is believed sufficiently obvious that the space 261 of FIG. 13 could be readily connected to the same-numbered space in FIG. 17 so that the driver's manipulation of throttle lever 375 of FIG. 20 could be utilized to induce a lowering of the low range downshift actuation pressure when the engine vacuum would be diminished under advanced throttle setting of rod 378. The steering action established by the magnet valves MV, left and right, is somewhat different in the case of FIGS. 17 and 20, from that of FIG. 14 in that the degree of pressure and leakage capacity of the bores and porting are related to the length of time during which the respective armatures effectively hold the ball valves 240 off the seats during a steering impulse interval, and also related to the fluid pressure timing effects within the magnet valve chambers. The steering feel of the vehicle with the FIG. 17 is somewhat different; therefore, since the driver in regulating the degree of steering brake pressure for a given desired steering effect will apply and drain the control pressures in spaces 196 and 197 more frequently than with the FIG. 14 control.

In describing the present invention, the specification herewith has not provided a showing of mechanical linkages of obvious nature, since such do not appear to lie in the realm of instant invention. For example, in disclosing reverse and low forward ratio reaction bands 45 and 51 in FIG. 1, it has been deemed only necessary to show operating controls for one, as in FIG. 4. Likewise in FIG. 5 the actuation mechanism for one of the vehicle brakes 46 or 50, suffices for both, and the external arm 88 may be attached to whatever lever or pedal system may be needed, without exercise of invention, which fact equally pertains to the operation of the cam ring actuator rod 98 of the modification of FIG. 8, since applicant believes it would require no invention to connect the rocker mechanism 86, 87 to rod 98 instead of to linkage 85, 84, 83 of FIG. 5, and to operate same by a pedal such as 380 or 381 of FIG. 20.

Similarly the external electrical controls for the differential steering mechanism of FIG. 7 are referred to herein as sufficiently shown for the purpose of describing the teaching, in applicant's U.S. Patent 2,585,790 and there is no need for duplication here.

Further in FIGS. 9 to 12, it is not believed needful to burden this specification with a tedious recitation of commonly known mechanism for moving the steering control arm 188 or the ratio selection arm 112', since many versions of mechanical linkages for positioning these elements are available to the designer equipped with the teachings given herein.

While it may not be readily apparent, the present specification is drawn to bring out the essential features and factors of novelty, with resort to the schematic instruction method wherever possible, such as offered in FIGS. 14 and 17, although it has been thought particularly useful to duplicate some of the members and elements of those figures in separate detailed parts showings, as exemplified by FIGS. 13, 15, 18, 19 and 21. The diagram of FIG. 20 is only provided to show a generalized view of an example of correlation of controls pertaining to FIG. 17, as distinct from the mechanical valve operating arrangement for the control elements of FIG. 14.

I claim:

1. In fluid pressure systems for power drive mechanisms having input and output shafting, a driving assembly coupling said shafting and including ratio-changing friction members, fluid pressure actuators for said members, a pressure delivery space, a fluid passage connected to said space, a pump supplying said pressure delivery space through said passage, a movable pressure delivery valve operative to distribute the pressure in said delivery space selectively to said actuators, said valve having outlet ports separately connected to each actuator and having exhaust ports effective to vent the pressure of any of said actuators other than one selected by motion of said valve, a pressure regulator valve connected to said space and adapted to provide therein a predetermined pressure level, said regulator valve being responsive to the pressure of said space for relieving pressure therefrom at above said level, and additional pressure responsive means connected to one of the said outlet ports of said delivery valve and effective to modify the pressure relieving action of said regulator valve in accordance with the presence or absence of pressure in the said outlet port.

2. In control systems for variable speed ratio transmissions, a power shaft and load shafts, a variable speed drive assembly coupling said power and load shafts adapted to provide two forward ranges and one reverse drive range in which said load shafts are driven at infinitely variable speeds varying inversely with torque, said assembly consisting of a fluid torque converter unit driven by said power shaft, of a change speed gear unit driven by said torque converter and driving said load shaft, with friction means for establishing the said drive ranges consisting of direct-drive torque-supporting members and torque-reaction-holding members actuable to provide high range and low range drive respectively, pumping means driven by said shafts connected to a fluid pressure system for said assembly operative to supply fluid pressure to actuate said members, actuation means for said members, valving movable to direct the pressure of said system to said actuation means, pilot valves adapted to control the movement of said valving by directing a portion of the fluid pressure supplied by said pumping means to move said valving, and manually operable selection means for said pilot valves effective to control the distribution of said pressure by said valving for selective drive by said assembly in said low or high ranges.

3. In power-driven vehicles, the combination of an engine, a variable speed ratio driving assembly composed of a fluid torque converter driven by said engine and driving a step ratio transmission gear unit coupled to load shafting, said unit being adapted to provide selective high range drive and low range drive obtained by individual actuation of friction members arranged to couple torque directly through said unit or alternately to establish low range drive torque reaction for gear drive by said unit, power operated mechanism for actuating said friction members including a fluid pressure supply having a plurality of pumps driven by rotation of said engine and said load shafting, fluid pressure actuators for said members, fluid pressure passages adapted to connect said supply with said actuators, control valve means arranged to distribute the pressure of said passages selectively to said actuators and effective thereby to establish drive selectively in said high and low ranges, auxiliary pilot valving deriving fluid pressure from said supply and arranged to apply said fluid pressure to said control valve means to cause said control valve means to move in a pattern of fluid pressure distribution to provide the said selective low and high range drive, an operator operated control for said pilot valving effective to select alternate motion of said control valve means in said pattern for establishing said low or high range drive.

4. In power-driven vehicles, the combination of an engine, a variable speed ratio driving assembly composed of a fluid torque converter driven by said engine and driving a step ratio transmission gear unit coupled to load shafting, said unit being adapted to provide selective high range drive and low range drive obtained by individual actuation of friction members arranged to couple torque directly through said unit or alternately to establish low range drive torque reaction for gear drive by said unit, power operated mechanism for actuating said friction members including a fluid pressure supply having a plurality of pumps drivn by rotation of said engine and said load shafting, fluid pressure actuators for said members, fluid pressure passages adapted to connect said supply with said actuators, control valve means arranged to distribute the pressure of said passages selectively to said actuators and effective thereby to establish drive selectively in said high and low ranges, auxiliary pilot valving deriving fluid pressure from said supply arranged to apply said fluid pressure selectively to said control valve means for moving the latter in a predetermined pattern of fluid pressure distribution which provides said selective drive in said high and low ranges, operating means for said valving electrically energizable to cause the valving to admit fluid pressure to operate said control valve means, a source of electric power, and operator operable switching mechanism equipped with circuits adapted to connect said operating means selectively with said electric power source in accordance with said pattern, said mechanism being effective to cause selective delivery of fluid pressure to said actuators by said control valve means through the agency of said pilot valving.

5. In power-driven vehicles, the combination of an engine, a variable speed ratio driving assembly composed of a fluid torque converter driven by said engine and driving a step ratio transmission gear unit coupled to load shafting, said unit being adapted to provide selective high range drive and low range drive obtained by individual actuation of friction members arranged to couple torque directly through said unit or alternately to establish low range drive torque reaction for gear drive by said unit, power operated mechanism for actuating said friction members including a fluid pressure supply having a plurality of pumps driven by rotation of said engine and said load shafting, fluid pressure actuators for said members, fluid pressure passages adapted to connect said supply with said actuators, control valve means arranged to distribute the pressure of said passages selectively to said actuators and effective thereby to establish drive selectively in said high and low ranges, a selected pump of said plurality of pumps driven constantly by said load shafting, braking means for said load shafting, braking controls for said braking means, and cooling jets for said braking means connected to the output of said selected pump for constant flow of lubricant to said braking means whenever said load shafting is rotating.

6. In power-driven vehicles, the combination of an engine, a variable speed ratio driving assembly composed of a fluid torque converter driven by said engine and driving a step ratio transmission gear unit coupled to load shafting, said unit being adapted to provide selective high range drive and low range drive obtained by individual actuation of friction members arranged to couple torque directly through said unit or alternately to establish low range drive torque reaction for gear drive by said unit, power operated mechanism for actuating said friction members including a fluid pressure supply having a plurality of pumps driven by rotation of said engine and said load shafting, fluid pressure actuators for said members, fluid pressure passages adapted to connect said supply with said actuators, control valve means arranged to distribute the pressure of said passages selectively to said actuators and effective thereby to establish drive selectively in said high and low ranges, braking means for said load shafting, braking controls for causing application of said braking means, cooling jets for said braking means connected to the output of said plurality of pumps driven by said load shafting, and control means connected to said braking controls and operated therewith effective to increase the flow of fluid delivered by said pumps to said cooling jets whenever said braking controls are moved to cause application of said braking means.

7. In power-driven vehicles, the combination of an engine, a variable speed ratio driving assembly composed of a fluid torque converter driven by said engine and driving a step ratio transmission gear unit coupled to load shafting, said unit being adapted to provide selective high range drive and low range drive obtained by individual actuation of friction members arranged to couple torque directly through said unit or alternately to establish low range drive torque reaction for gear drive by said unit, power operated mechanism for actuating said friction members including a fluid pressure supply having a plurality of pumps driven by rotation of said engine and said load shafting, fluid pressure actuators for said members, fluid pressure passages adapted to connect said supply with said actuators, control valve means arranged to distribute the pressure of said passages selectively to said actuators and effective thereby to establish drive selectively in said high and low ranges, braking means operable to slow the speed of said load shafting, braking controls for said braking means, and fluid cooling jets for said braking means connected to said pumps, one of said pumps being driven by said load shafting and adapted to augment the pressure of said engine-driven pump and adapted to furnish augmented flow of cooling fluid to said jets when said braking control is moved to cause said braking means to diminish the speed of said load shafting.

8. A power transmission including in combination input and output power transmitting members, a plurality of means for connecting the members in torque transmitting relation at different speed ratios in the same hand of rotation, fluid pressure actuators for the connecting means, a source of fluid under pressure, a pressure regulator for maintaining a predetermined pressure in the source, selector means for conducting fluid from the source selectively to the individual actuators, and means responsive to the pressure of fluid in one of said actuators for modifying the action of the regulator to cause it to maintain a different pressure.

9. A power transmission including in combination input and output power transmitting members, a plurality of means for connecting the members in torque transmitting relation at different speed ratios in the same hand of rotation, fluid pressure actuators for the connecting means, a source of fluid under pressure, a plurality of pressure operated valves each of which is for conducting fluid from the source to one of the individual actuators, pilot valves each individually adapted to direct fluid from the source to one of the pressure operated valves and manually operable means for selectively operating the pilot valves to selectively actuate the connecting means.

10. A power transmission including in combination input and output power transmitting members, a plurality of means for connecting the members in torque transmitting relation at different speed ratios in the same hand of rotation, fluid pressure actuators for the connecting means, a source of fluid under pressure supplied by a pump driven by the input member and by a pump driven by the output member, selector means for conducting fluid from the source to the individual actuators, braking means for the output member, and a cooling conduit for the braking means connected to the pump driven by the output member to supply fluid to the braking means whenever the output member is driven.

11. Apparatus as defined in claim 10 having means for applying the braking means, and control means connected to the applying means and to the source of fluid for increasing the flow of fluid to the braking means whenever the applying means is operated.

12. In a power driving device in combination an engine driving an input member, an output member, friction means for connecting the input and output members in torque transmitting relation, a fluid pressure responsive actuator adapted to hold the friction means in engagement wherein the speed of actuation and/or holding force on the friction means is responsive to the pressure in the actuator, a source of pressure for supplying fluid at maximum pressure to the actuator, and means responsive to the pressure of the intake manifold of the engine for relieving pressure in the actuator.

13. A power transmission including in combination, input and output power transmitting members, a plurality of means for connecting the members in torque transmitting relation at different speed ratios, fluid pressure actuators for the connecting means, a source of fluid under pressure, a pressure regulator adapted to maintain a predetermined pressure in the source, selector means for conducting fluid from the source selectively to the individual actuators, means responsive to the pressure of fluid in one of the actuators for modifying the action of the regulator to cause it to maintain a different pressure, a discharge connection for conducting from the regulator valve excess fluid above that necessary to maintain the predetermined pressure in the source, and means for maintaining in the discharge connection a pressure below the pressure in said source.

14. A power transmission including in combination input and output power transmitting members, first means for coupling the members in torque transmitting relation at a relatively low speed ratio from input to output, a second means for coupling the members at a relatively high speed ratio from input to output, a source of fluid under pressure, a pressure regulator for maintaining a predetermined pressure in the source, selector means for conducting fluid from the source selectively to the first and second means and means responsive to the presence of fluid under pressure in the second means for modifying the action of the regulator valve to cause it to maintain a low pressure.

15. In a power driving device in combination an engine driving an input member, an output member, a first friction means for connecting the input and output members in torque transmitting relation at a relatively low speed ratio from input to output, a second friction means for connecting the input and output members in torque transmitting relation at a relatively high speed ratio from input to output, a fluid pressure responsive actuators adapted to hold each friction means in engagement wherein the speed of actuation and/or holding forces on each friction means is responsive to the pressure in its individual actuator, a source of pressure for supplying fluid at a predetermined pressure, means for selectively directing the fluid under pressure to the actuators and means responsive to the torque demand on the engine for reducing pressure in the first actuator.

16. In fluid pressure control systems for transmissions, driving and driven shafts coupled by a change-speed transmission equipped with fluid pressure actuators for changing the speed ratio, control valve means for selective delivery of fluid pressure to said actuators one at a time, a first pump driven by said driving shaft, a second pump driven by said driven shaft, a regulator valve casing, a pressure-responsive valve in said casing and adapted to move therein, a pressure feed passage leading from said casing to supply said control valve means, a relief passage in said casing, a spring operative to urge said valve in one direction, and a pressure space in said valve casing connected to both said pumps effective to urge said pressure-responsive valve against the spring and to cause the valve to supply a predetermined pressure from either or both of said pumps to said feed passage while relieving excess pressure to said relief passage, pressure delivery passages leading to said actuators and selected by movement of said control valve means, and a pressure space in said regulator valve casing and a pressure-responsive area on said regulator valve arranged to provide a pressure aiding the force of said spring and connected to one of said pressure delivery passages, such that when said one of the said delivery passages is selected, the regulator valve provides feed pressure at higher value than when the said control valve is positioned to deliver pressure fluid to another of said delivery passages.

17. In a fluid pressure control system for change-speed gearing having a plurality of fluid pressure actuators which establish different drive connections through said gearing, the combination of a source of pressure fluid, means including a selector valve and passages which supplies fluid from the source to one or another of said actuators to establish one or another of said drive connections, and a pressure regulator valve connected to the source which is operative to limit the pressure in the system to one maximum value, said pressure regulator valve having means responsive to fluid pressure which causes the regulator valve to limit the pressure in the system to a different maximum value, and a fluid connection to one of said actuators which directs pressure from the system to said fluid pressure responsive means when one of said actuators is supplied with fluid pressure so that the pressure in the system is limited to a different maximum value when one of the drive connections is established than when another drive connection is established.

18. In a fluid pressure control system for change-speed gearing having a plurality of pressure actuators which establish different drive connections through the gearing, the combination of a source of pressure fluid, means including a selector valve and passages which supplies fluid from the source to one or another of said actuators to establish one or another of said drives, and a pressure regulator valve connected to the source which is normally operative to limit the pressure in the system to a relatively high maximum value, said pressure regulator valve having means responsive to fluid pressure for reducing the maximum value of pressure limited by the regulator valve, and means for supplying fluid pressure from the system to said pressure responsive means of the regulator valve whenever pressure is directed to one particular actuator so that maximum pressure in the system is reduced during drive established by such particular actuator.

19. In a fluid pressure control system for change-speed gearing having a plurality of pressure actuators which establish different drive connections through the gearing, the combination of a source of pressure fluid, means including a selector valve and passages which supplies fluid from the source to one or another of said actuators to establish one or another of said drives, and a pressure regulator valve connected to the source which is normally operative to limit the pressure in the system to a relatively high maximum value, said pressure regulator valve having means responsive to fluid pressure for reducing the maximum value of pressure limited by the regulator valve, and a fluid supplying connection between one particular actuator and said pressure-responsive means of the regulator valve so that maximum pressure in the system is reduced during drive established by such particular actuator.

20. In a fluid pressure control system for change-speed gearing having a plurality of pressure actuators which establish different drive connections through the gearing, the combination of a source of pressure fluid, means including a selector valve and passages which supplies fluid from the source to one or another of said actuators to establish one or another of said drives, and a pressure regulator valve connected to the source which is normally operative to limit the range of pressure in the system to a relatively low value, said pressure regulator valve having means responsive to fluid pressure for increasing the maximum value of pressure limited by the regulator valve, means for supplying pressure from the system to said pressure-responsive means of the regulator valve whenever one particular actuator is supplied with fluid pressure, and means which prevents the supply of pressure to said pressure-responsive means whenever another particular actuator is supplied with fluid pressure.

21. In a fluid pressure control system for change-speed gearing having a plurality of pressure actuators which establish different drive connections through the gearing, the combination of a source of pressure fluid, means including a selector valve and passages which supplies fluid from the source to one or another of said actuators to establish one or another of said drives, and a pressure regulator valve connected to the source which is normally operative to limit the pressure in the system to a relatively low maximum value, said pressure regulator valve having means responsive to fluid pressure for increasing the maximum value of pressure limited by the regulator valve, means which normally supplies pressure from the system to said pressure-responsive means of the regulator valve and means which prevents the supply of pressure to said pressure-responsive means whenever one particular actuator is supplied with fluid pressure.

22. In a fluid pressure control system for change-speed gearing having a plurality of pressure actuators which establish different drive connections through the gearing, the combination of a source of pressure fluid, means including a selector valve and passages which supplies fluid from the source to one or another of said actuators to establish one or another of said drives, and a pressure regulator valve connected to the source which is normally operative to limit the pressure in the system to a relatively low maximum value, said pressure regulator valve having means responsive to fluid pressure for increasing the maximum value of pressure limited by the regulator valve, means which normally supplies pressure from the system to said pressure-responsive means of the regulator valve, a vent valve operative to interrupt the supply of fluid to the pressure-responsive means and to vent the pressure-responsive means, and means responsive to the establishment of one particular drive for operating the vent valve to reduce the maximum value of the pressure of the system.

23. In a fluid pressure control system for change-speed gearing having a plurality of pressure actuators which establish different drive connections through the gearing, the combination of a source of pressure fluid, means including a selector valve and passages which supplies fluid from the source to one or another of said actuators to establish one or another of said drives, and a pressure regulator valve connected to the source which is normally operative to limit the pressure in the system to one maximum value, said pressure regulator valve having means responsive to fluid pressure for changing the maximum value of pressure limited by the regulator valve, means normally supplying fluid pressure from the system to said pressure-responsive means of the regulator valve, and means for interrupting the fluid supply to the pressure-responsive means whenever one particular drive connection is established.

24. In a fluid pressure control system for change-speed gearing having a plurality of pressure actuators which establish different drive connections through the gearing, the combination of a source of pressure fluid, means including a selector valve and passages which supplies fluid from the source to one or another of said actuators to establish one or another of said drives, and a pressure regulator valve connected to the source which is normally operative to limit the pressure in the system to one maximum value, said pressure regulator valve having means responsive to fluid pressure for changing the maximum value of pressure limited by the regulator valve, means normally supplying fluid pressure from the system to said pressure-responsive means of the regulator valve, a valve for interrupting the supply of fluid to the pressure-responsive means and for venting the pressure-responsive means, a fluid pressure motor for operating the last mentioned valve and a fluid pressure connection between the motor and one particular actuator.

References Cited in the file of this patent

UNITED STATES PATENTS

| | | |
|---|---|---|
| Re. 22,967 | Nutt et al. | Jan. 27, 1948 |
| 2,019,146 | Livermore | Oct. 29, 1935 |
| 2,144,596 | Daiber | Jan. 17, 1939 |
| 2,416,154 | Chilton | Feb. 18, 1947 |
| 2,433,052 | Kelley | Dec. 23, 1947 |
| 2,450,161 | Price | Sept. 28, 1948 |
| 2,453,877 | Trail | Nov. 16, 1948 |
| 2,516,203 | Greenlee et al. | July 25, 1950 |
| 2,516,208 | Hasbany | July 25, 1950 |
| 2,548,208 | Evernden | Apr. 10, 1951 |
| 2,557,421 | Evernden | June 19, 1951 |
| 2,560,554 | Colby | July 17, 1951 |
| 2,568,135 | Vincent | Sept. 18, 1951 |
| 2,576,336 | Farkas | Nov. 27, 1951 |
| 2,577,413 | Frailing | Dec. 4, 1951 |
| 2,596,931 | Kelley | May 13, 1952 |
| 2,604,197 | Livermore | July 22, 1952 |
| 2,633,035 | Livermore | Mar. 31, 1953 |
| 2,633,760 | Kelley | Apr. 7, 1953 |
| 2,645,137 | Roche | July 14, 1953 |
| 2,693,711 | Kelbel et al. | Nov. 9, 1954 |

FOREIGN PATENTS

| | | |
|---|---|---|
| 5,291 | Great Britain | Mar. 4, 1909 |

UNITED STATES PATENT OFFICE
CERTIFICATE OF CORRECTION

Patent No. 3,010,342                                                       November 28, 1961

Oliver K. Kelley

It is hereby certified that error appears in the above numbered patent requiring correction and that the said Letters Patent should read as corrected below.

Column 1, line 25, for "truck" read -- track --; column 5, line 30, for "seen" read -- seem --; line 32, for "is" read -- in --; column 8, line 50, for "not" read -- nor --; line 58, for "recombing" read -- recombining --; column 12, line 7, for "or" read -- of --; line 35, for "The" read -- This --; same column 12, line 46, after "brake" insert -- system --; column 15, line 7, for "FIG. 17" read -- FIG. 7 --; line 75, for "thrus" read -- thru --; column 16, line 51, for '"A,"' read -- "R," --; column 18, line 71, after "output-speed" insert -- gear --; column 20, line 1, for "mechanism" read -- mechanisms --; column 25, line 29, for "thus" read -- thru --; line 35, for "loss" read -- boss --; column 26, line 43, for "and", second occurrence, read -- end --; column 27, line 72, for "or" read -- of --.

Signed and sealed this 8th day of May 1962.

(SEAL)
Attest:

ERNEST W. SWIDER
Attesting Officer

DAVID L. LADD
Commissioner of Patents